United States Patent
Zhang et al.

(10) Patent No.: US 11,797,116 B2
(45) Date of Patent: Oct. 24, 2023

(54) TOUCH PANEL, METHOD FOR TESTING THE SAME, AND DISPLAY DEVICE

(71) Applicant: Shanghai Tianma Micro-Electronics Co., Ltd., Shanghai (CN)

(72) Inventors: Jing Zhang, Shanghai (CN); Feng Lu, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 0 days.

(21) Appl. No.: 17/583,199

(22) Filed: Jan. 25, 2022

(65) Prior Publication Data

US 2022/0147175 A1    May 12, 2022

(30) Foreign Application Priority Data

Sep. 29, 2021 (CN) .......................... 202111155004.3

(51) Int. Cl.
*G06F 3/041* (2006.01)
*G01R 31/00* (2006.01)
*G06F 3/044* (2006.01)

(52) U.S. Cl.
CPC .......... *G06F 3/0412* (2013.01); *G06F 3/0446* (2019.05); *G06F 3/04164* (2019.05)

(58) Field of Classification Search
None
See application file for complete search history.

(56) References Cited

U.S. PATENT DOCUMENTS

| | | | | |
|---|---|---|---|---|
| 2009/0262094 A1* | 10/2009 | Lin | ........................ | H05K 1/026 345/174 |
| 2016/0155408 A1* | 6/2016 | Lee | .......................... | G09G 3/20 345/211 |
| 2016/0283027 A1* | 9/2016 | Hao | ....................... | G06F 3/0446 |
| 2016/0358525 A1* | 12/2016 | Huang | .................. | G06F 3/0445 |
| 2018/0113333 A1* | 4/2018 | Zhu | ........................ | G09G 3/3611 |
| 2019/0005861 A1* | 1/2019 | Huang | .................. | H01L 27/124 |
| 2020/0090567 A1* | 3/2020 | Lee | ...................... | G09G 3/3266 |
| 2021/0191553 A1* | 6/2021 | Jang | ....................... | G06F 3/0443 |

FOREIGN PATENT DOCUMENTS

| | | | | |
|---|---|---|---|---|
| CN | 104808859 A | * | 7/2015 | ............. G06F 3/041 |
| CN | 205750184 U | | 11/2016 | |
| CN | 106909253 A | | 6/2017 | |
| CN | 112669737 A | * | 4/2021 | ............. G06F 3/041 |

* cited by examiner

*Primary Examiner* — Krishna P Neupane
(74) *Attorney, Agent, or Firm* — KILPATRICK TOWNSEND & STOCKTON, LLP

(57) ABSTRACT

A touch panel, a method for testing the touch panel and a display device are provided. In order to test the touch panel, all touch electrodes are connected in series to obtain a branch during the testing phase, a test signal is inputted to the branch, and a feedback signal outputted by the branch is analyzed for determination. All the touch electrodes are isolated from each other during a phase rather than the testing phase. Therefore, whether a touch electrode is abnormal is determined by controlling all the touch electrodes to be connected in series during the testing phase and isolated from each other during the phase rather than the testing phase, to improve efficiency for testing a touch electrode and simplifying the process of testing the touch electrode.

17 Claims, 21 Drawing Sheets

TOUCH PANEL, METHOD FOR TESTING THE SAME, AND DISPLAY DEVICE

CROSS-REFERENCE TO RELATED APPLICATIONS

The present application claims priority to Chinese Patent Application No. 202111155004.3, titled "TOUCH PANEL, METHOD FOR TESTING THE SAME, AND DISPLAY DEVICE", filed on Sep. 29, 2021 with the China National Intellectual Property Administration, which is incorporated herein by reference in its entirety.

FIELD

The present disclosure relates to the field of displays, and in particular to a touch panel, a method for testing the touch panel, and a display device.

BACKGROUND

With the continuous development of display technology, touch display devices are increasingly used in various fields. At present, touch display devices are classified into types including plug-in touch display devices, surface-covering touch display devices, and in-cell touch display devices according to structure. The in-cell touch display device, in which touch electrodes are embedded inside a display panel, decreasing a thickness of an entire display device and greatly reducing manufacturing cost of the touch display device, is popular among panel manufacturers.

In an existing in-cell touch screen, an electrode layer in a display panel is generally divided into multiple touch electrode blocks, and each of the multiple touch electrode blocks is electrically connected to a control integrated circuit (IC) via a wire. At present, there is no mature and effective way in the manufacturing process to detect whether a touch electrode is abnormal before the touch electrode is electrically connected to the control IC. Whether the touch electrode is abnormal is determined only by testing a display function of the display panel, resulting in time-consuming and cumbersome processes.

SUMMARY

In view of this, a touch panel, a method for testing the touch panel and a display device are provided according to the present disclosure.

The following embodiments are provided according to the present disclosure.

In one embodiment, a touch panel includes a substrate, a touch electrode array, and a test circuit. The touch electrode array is arranged on a side of the substrate, and the touch electrode array includes multiple touch electrodes arranged in an array. The test circuit is electrically connected to the touch electrode array, and the test circuit is configured to connect all the touch electrodes in series during a testing phase, and electrically isolate all the touch electrodes from each other during a phase rather than the testing phase.

In another embodiment, a method for testing a touch panel is further provided according to the present disclosure. The method is applied to the above touch panel. The method includes: connecting all the touch electrodes in series to obtain a branch during a testing phase, inputting a test signal to the branch, and analyzing a feedback signal outputted by the branch for determination; and isolating all the touch electrodes from each other during a phase rather than the testing phase.

In yet another embodiment, a display device is further provided according to the present disclosure. The display device includes a touch panel. The touch panel includes a substrate, a touch electrode array, and a test circuit. The touch electrode array is arranged on a side of the substrate, and the touch electrode array includes multiple touch electrodes arranged in an array. The test circuit is electrically connected to the touch electrode array, and the test circuit is configured to connect all the touch electrodes in series during a testing phase, and electrically isolate all the touch electrodes from each other during a phase rather than the testing phase.

BRIEF DESCRIPTION OF THE DRAWINGS

In order to more clearly illustrate the embodiments of the present disclosure, the drawings to be used in the description of the embodiments are briefly described below. Apparently, the drawings in the following description show only some embodiments of the present disclosure, and other drawings may be obtained.

DETAILED DESCRIPTION OF EMBODIMENTS

The embodiments of the present disclosure are described clearly and completely in conjunction with the drawings in the embodiments of the present disclosure hereinafter. It is apparent that the described embodiments are only some rather than all embodiments of the present disclosure.

As described in the background part, in the existing in-cell touch screen an electrode layer in a display panel is generally divided into multiple touch electrode blocks, and each of the multiple touch electrode blocks is electrically connected to a control integrated circuit (IC) via a wire. At present, there is no mature and effective way in the manufacturing process to detect whether a touch electrode is abnormal before the touch electrode is electrically connected to the control IC. Whether the touch electrode is abnormal is determined only by testing a display function of the display panel, resulting in time-consuming and cumbersome processes.

In view of this, a touch panel, a method for testing the touch panel and a display device are provided according to embodiments of the present disclosure, and the problems in the conventional technology are effectively solved. Further, efficiency for testing a touch electrode is improved, and the process of testing the touch electrode is simplified.

The embodiments of the present disclosure are illustrated in detail with reference to FIGS. 1 to 23.

Figure 1:
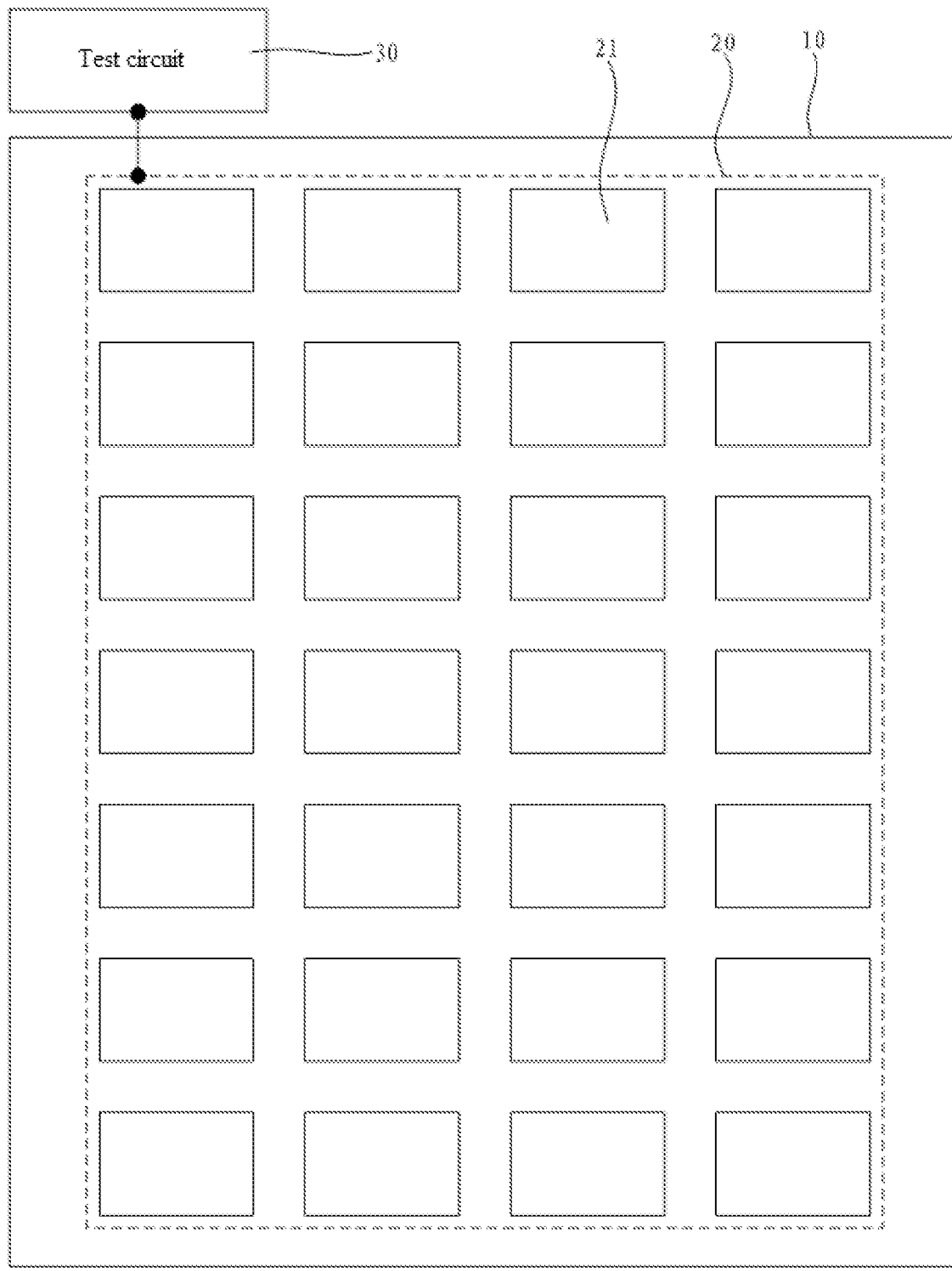
FIG. 1 is a schematic structural diagram showing a touch panel according to an embodiment of the present disclosure.

Reference is made to FIG. 1, which is a schematic structural diagram showing a touch panel according to an embodiment of the present disclosure. The touch panel includes a substrate 10, a touch electrode array 20 on a side of the substrate 10, and a test circuit 30 electrically connected to the touch electrode array 20. The touch electrode array includes multiple touch electrodes 21 arranged in an array. The test circuit 30 is configured to connect all the touch electrodes 21 in series during a testing phase, and electrically isolate all the touch electrodes 21 from each other during a phase rather than the testing phase.

According to the embodiments of the present disclosure, in order to test the touch panel, all the touch electrodes are connected in series to obtain a branch during the testing phase, a test signal is inputted to the branch, and a feedback signal outputted by the branch is analyzed for determination. All the touch electrodes are isolated from each other during a phase rather than the testing phase. Therefore, whether a touch electrode is abnormal is determined by controlling all the touch electrodes to be connected in series during the testing phase and isolated from each other during the phase rather than the testing phase, to improve efficiency for testing a touch electrode and simplifying the process of testing the touch electrode.

In an embodiment of the present disclosure, the test signal and the feedback signal each are a voltage signal or a current signal. In order to test the touch panel, all the touch electrodes are connected in series to obtain a branch, and a test signal is inputted to the branch. The test signal passes through the touch electrodes that are connected in series, and then a feedback signal is generated and is outputted from a last touch electrode. Then, it is determined, based on a result of whether the feedback signal matches expectations, whether there is a touch electrode among all the touch electrodes are connected in series that is abnormal.

Figure 2:
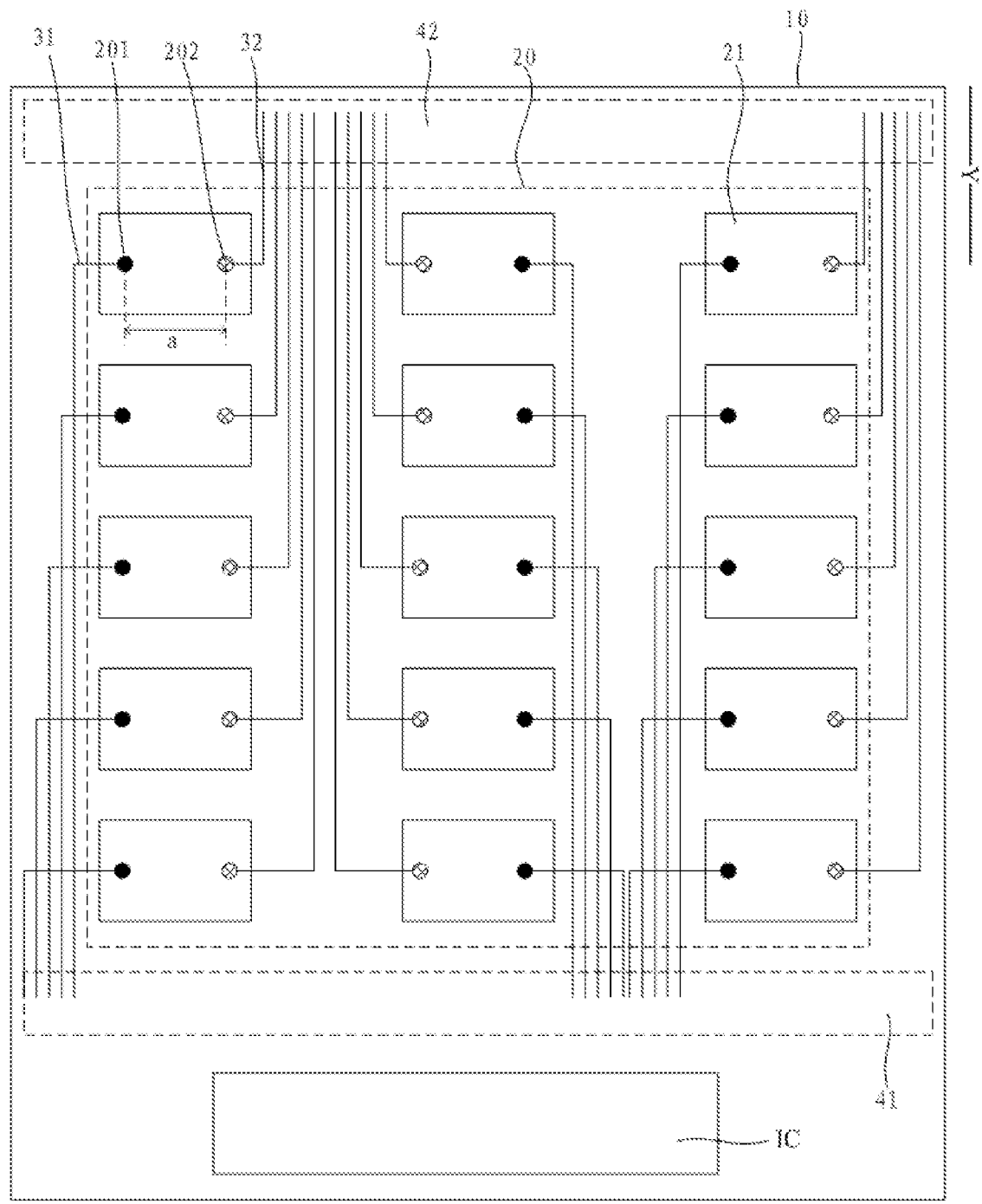
FIG. 2 is a schematic structural diagram showing a touch panel according to another embodiment of the present disclosure.

Reference is made to FIG. 2, which is a schematic structural diagram showing a touch panel according to another embodiment of the present disclosure. The test circuit 30 includes multiple test lead wires. Each of the multiple touch electrodes 21 includes a first connection terminal 201 and a second connection terminal 202. For the same touch electrode 21, a distance between the first connection terminal 201 and the second connection terminal 202 is greater than zero.

The multiple test lead wires include a first test lead wire 31 and a second test lead wire 32. The first test lead wire 31 is electrically connected to the first connection terminal 201 of the touch electrode 21. The second test lead wire 32 is electrically connected to the second connection terminal 202 of the touch electrode 21. The first test lead wire 31 extends to a first area 41. The second test lead wire 32 extends to a second area 42. Along a first direction Y, the first area 41 is at one end of the touch electrodes 21, and the second area 42 is at the other end of the touch electrodes 21. The first direction Y is parallel to the touch panel.

All the touch electrodes 21 according to the embodiments of the present disclosure may be arranged in an array of multi-row×multi-column. The test lead wires may be arranged between adjacent touch electrodes 21. In one embodiment, in a case that the touch electrodes 21 are arranged on one layer and the test lead wires are arranged on another layer, orthographic projection of the test lead wires on the substrate 10 may pass through orthographic projection of the touch electrodes 21 on the substrate 10. Arrangement of the test lead wires relative to the touch electrodes 21 is not limited herein.

In an embodiment of the present disclosure, the test lead wires are arranged between adjacent touch electrodes 21, and a direction along which rows of the touch electrodes are arranged serves as the first direction Y. For touch electrodes 21 in the same column, first test lead wires 31 respectively connected to the touch electrodes 21 are arranged on one same side of the touch electrodes 21 in a second direction, and second test lead wires 32 respectively connected to the touch electrodes 21 are arranged on the other same side of the touch electrodes 21 in the second direction, to facilitate connection between the first test lead wires 31 and connection between the second test lead wires 32. A direction along which columns of the touch electrodes are arranged serves as the second direction.

In the touch panel according to the embodiment of the present disclosure, the first test lead wires extend to the first area, and the second test lead wires extend to the second area, which is convenient for connecting the first test lead wires in a set mode in the first area and connecting the second test lead wires in a set mode in the second area. Further, a structure for connecting first test lead wires is independent of a structure for connecting the second test lead wires, optimizing the layout of wires on the touch panel.

As shown in FIG. 2, a control chip IC is further arranged on the substrate 10 according to an embodiment of the present disclosure. The first direction Y according to the embodiment of the present disclosure is a direction from the touch electrode array 20 to the control chip IC. The first direction Y is not limited in the present disclosure.

It should be noted that the first area according to the embodiments of the present disclosure mainly indicates a direction in which a first test lead wire extends, and the second area according to the embodiments of the present disclosure mainly indicates a direction in which a second test lead wire extends. That is, the first test lead wire and the second test lead wire extend in opposite directions along the first direction. A size of the first area and a size of the second area are not limited herein.

Figure 3:
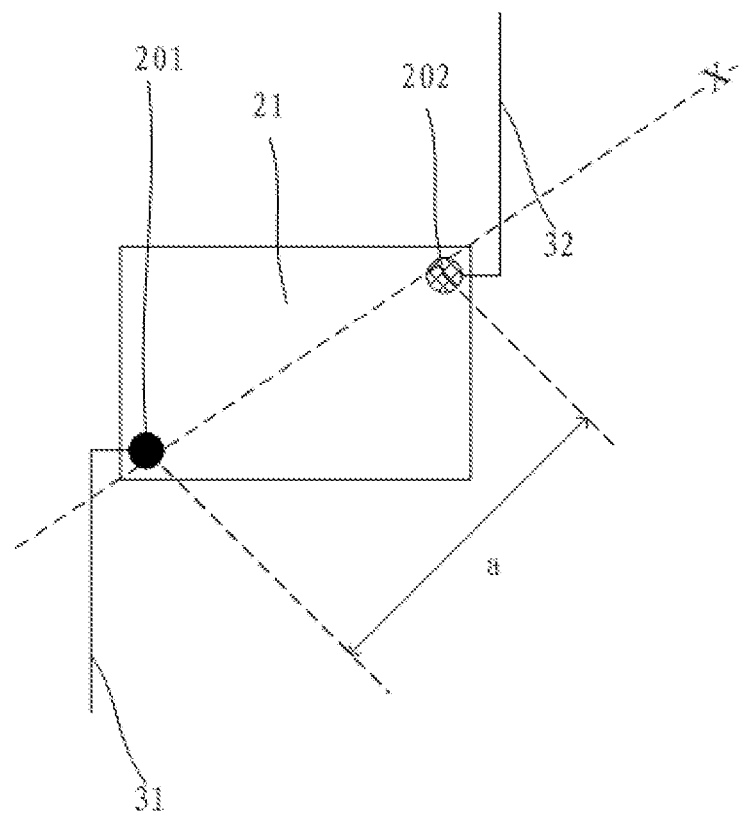
FIG. 3 is a schematic structural diagram showing a touch electrode according to an embodiment of the present disclosure.

In an embodiment of the present disclosure, there is a larger distance between the first connection terminal and the second connection terminal of the touch electrode in order to test most areas of the touch electrode. Reference is made to FIG. 3, which is a schematic structural diagram showing a touch electrode according to an embodiment of the present disclosure. A first connection terminal 201 and a second connection terminal 202 of the touch electrode 21 are respectively arranged at two ends of the touch electrode 21 along a direction X in which a line, between two points having a largest distance on the touch electrode 21, extends.

As shown in FIG. 3, the touch electrode 21 according to an embodiment of the present disclosure is rectangular. The first connection terminal 201 and the second connection terminal 202 are arranged at two ends of the rectangular touch electrode 21 along a diagonal line of the rectangular touch electrode 21.

Figure 4:
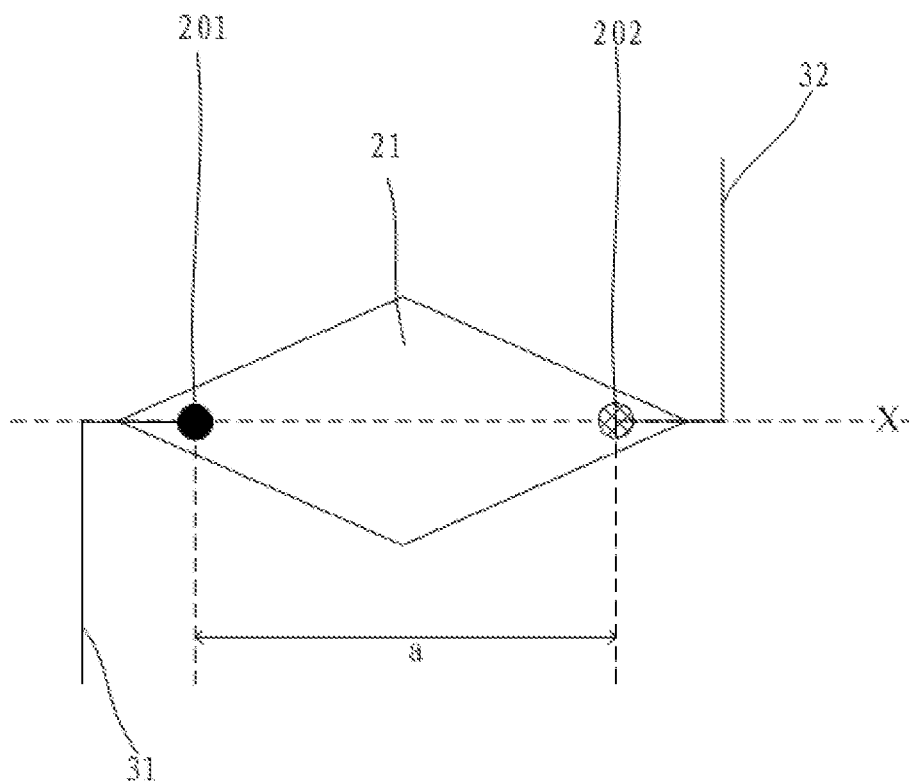
FIG. 4 is a schematic structural diagram showing a touch electrode according to another embodiment of the present disclosure.

In one embodiment, as shown in FIG. 4, the touch electrode 21 according to an embodiment of the present disclosure has a rhombus shape. The first connection terminal 201 and the second connection terminal 202 are arranged at two ends of the rhombus touch electrode 21 along a longest diagonal line.

It should be noted that the touch electrode according to the embodiments of the present disclosure may have a regular shape such as rectangle or rhombus, or an irregular shape, which is not limited in the present disclosure.

Figure 5:
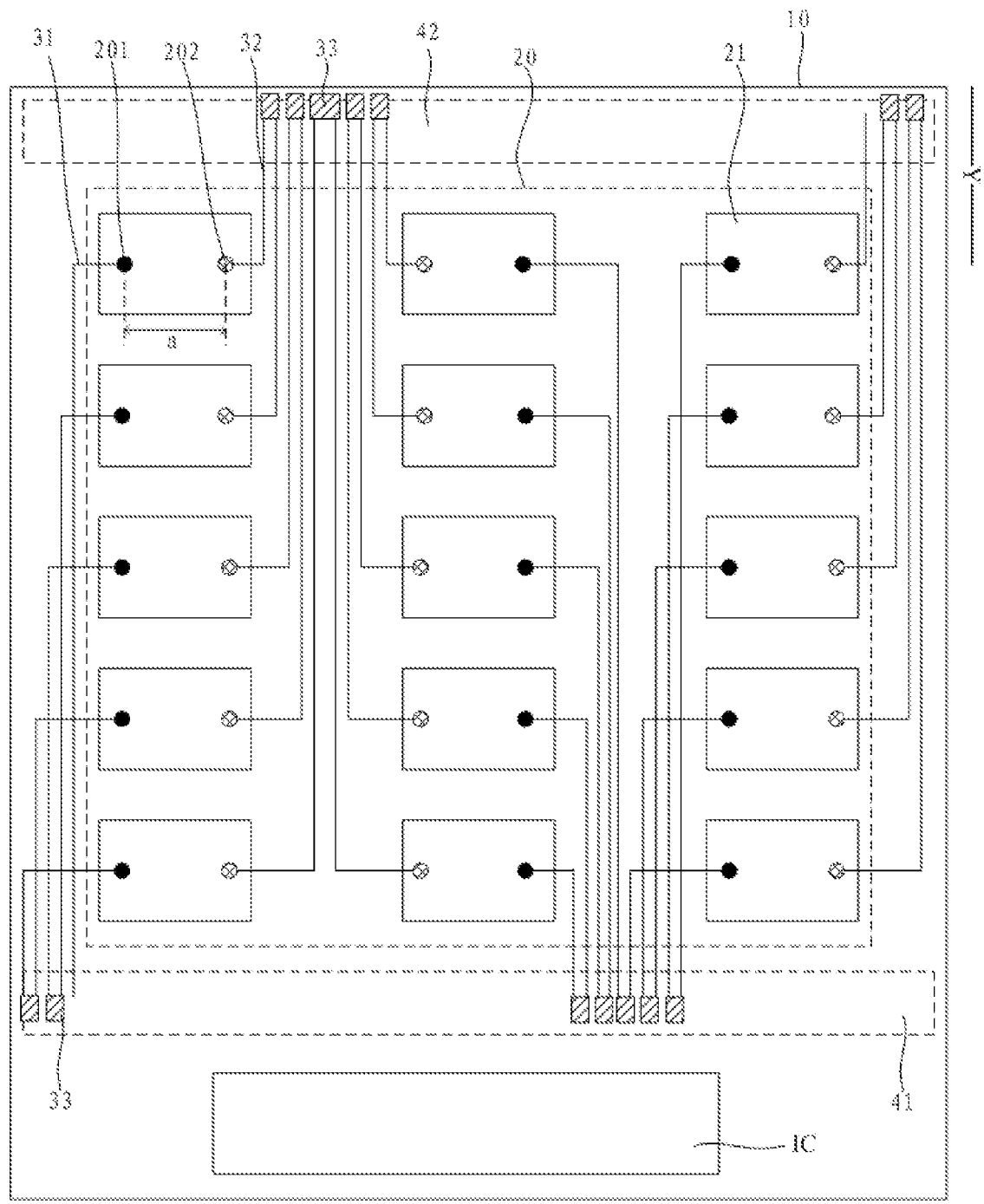
FIG. 5 is a schematic structural diagram showing a touch panel according to another embodiment of the present disclosure.

In an embodiment of the present disclosure, the test lead wires are connected by a connection device. A driving operation such as controlling is performed on the connection device. Therefore, all the touch electrodes are connected in series during the testing phase and are isolated from each other during a phase rather than the testing phase. Reference is made to FIG. 5, which is a schematic structural diagram showing a touch panel according to another embodiment of the present disclosure. As shown in FIG. 5, the test lead wires include a first test lead wire 31 and a second test lead wire 32. The first test lead wire 31 extends to the first area 41, and the second test lead wire 32 extends to the second area 42.

The test circuit 30 according to an embodiment of the present disclosure includes multiple connection devices 33. Among the multiple touch electrodes 21, a first test lead wire 31 electrically connected to an $n^{th}$ touch electrode 21 is electrically connected to a first test lead wire 31 electrically connected to an $(n-1)^{th}$ touch electrode via a connection device, and a second test lead wire 32 electrically connected to the $n^{th}$ touch electrode 21 is electrically connected to a second test lead wire 32 electrically connected to an $(n+1)^{th}$ touch electrode via a connection device 33. n is a positive integer greater than or equal to 3.

Figure 6:
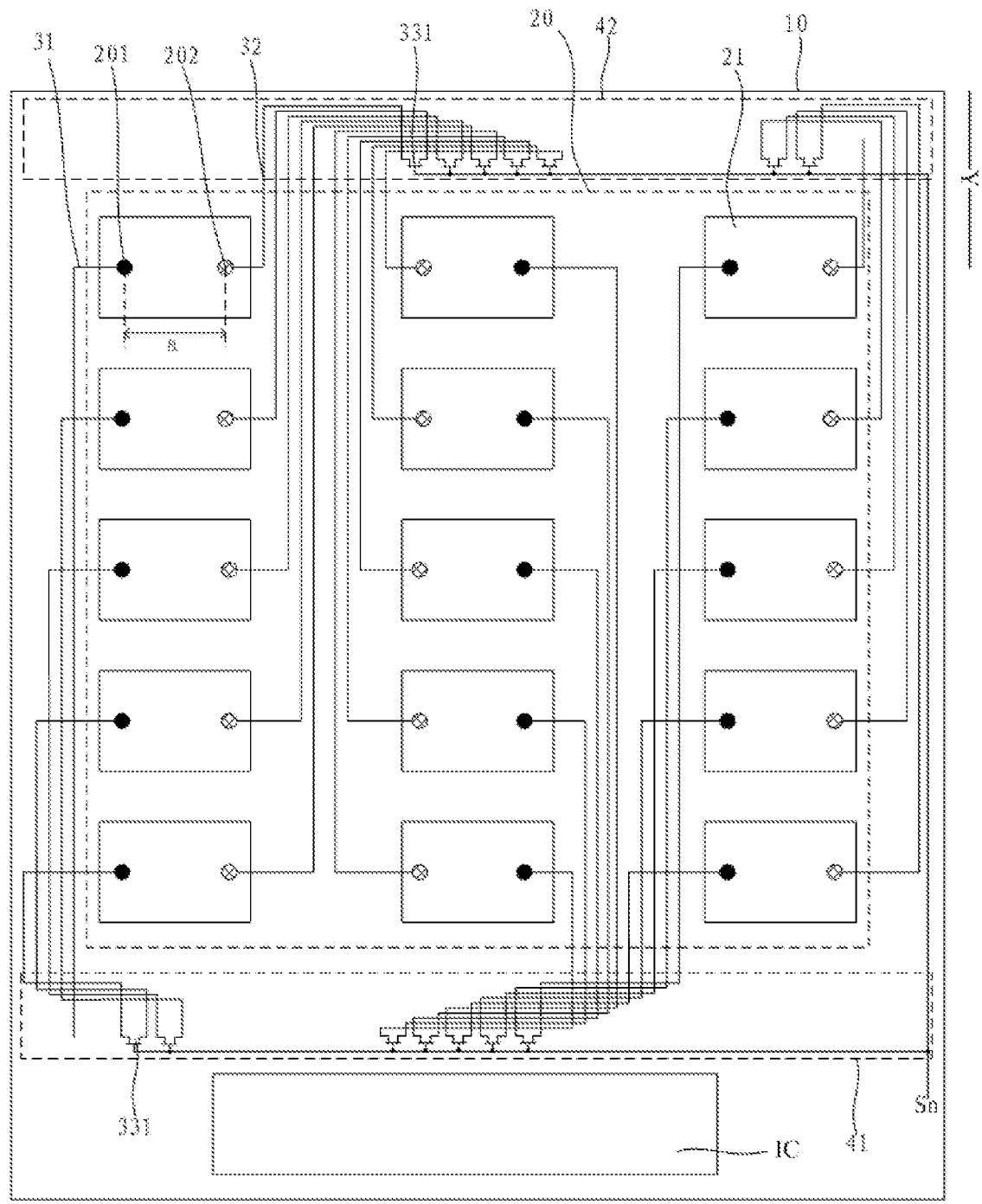
FIG. 6 is a schematic structural diagram showing a touch panel according to another embodiment of the present disclosure.

The connection device according to an embodiment of the present disclosure includes a transistor. Reference is made to FIG. 6, which is a schematic structural diagram showing a touch panel according to another embodiment of the present disclosure. The connection device 33 according to the embodiment of the present disclosure includes a connection transistor 331. A first terminal of the connection transistor 331 is electrically connected to one of the two touch electrodes 21 electrically connected to the connection device 33. A second terminal of the connection transistor 331 is electrically connected to the other of the two touch electrodes 21 electrically connected to the connection device 33. A gate of the connection transistor 331 is configured to receive a connection control signal. In response to the connection control signal, the connection transistor 331 is switched on in the testing phase, and is switched off in a phase rather than the testing phase.

The connection transistor according to the embodiment of the present disclosure is electrically connected to the touch electrode via a test lead wire. That is, the connection transistor is electrically connected to a touch electrode via a first test lead wire and is electrically connected to another touch electrode via a second test lead wire. In the testing phase, all the connection transistors are switched on in response to the connection control signal, and all the touch electrodes are connected in series. In a phase rather than the testing phase, all the connected transistors are switched off in response to the connection control signal, and all the touch electrodes are isolated from each other.

Figure 7:
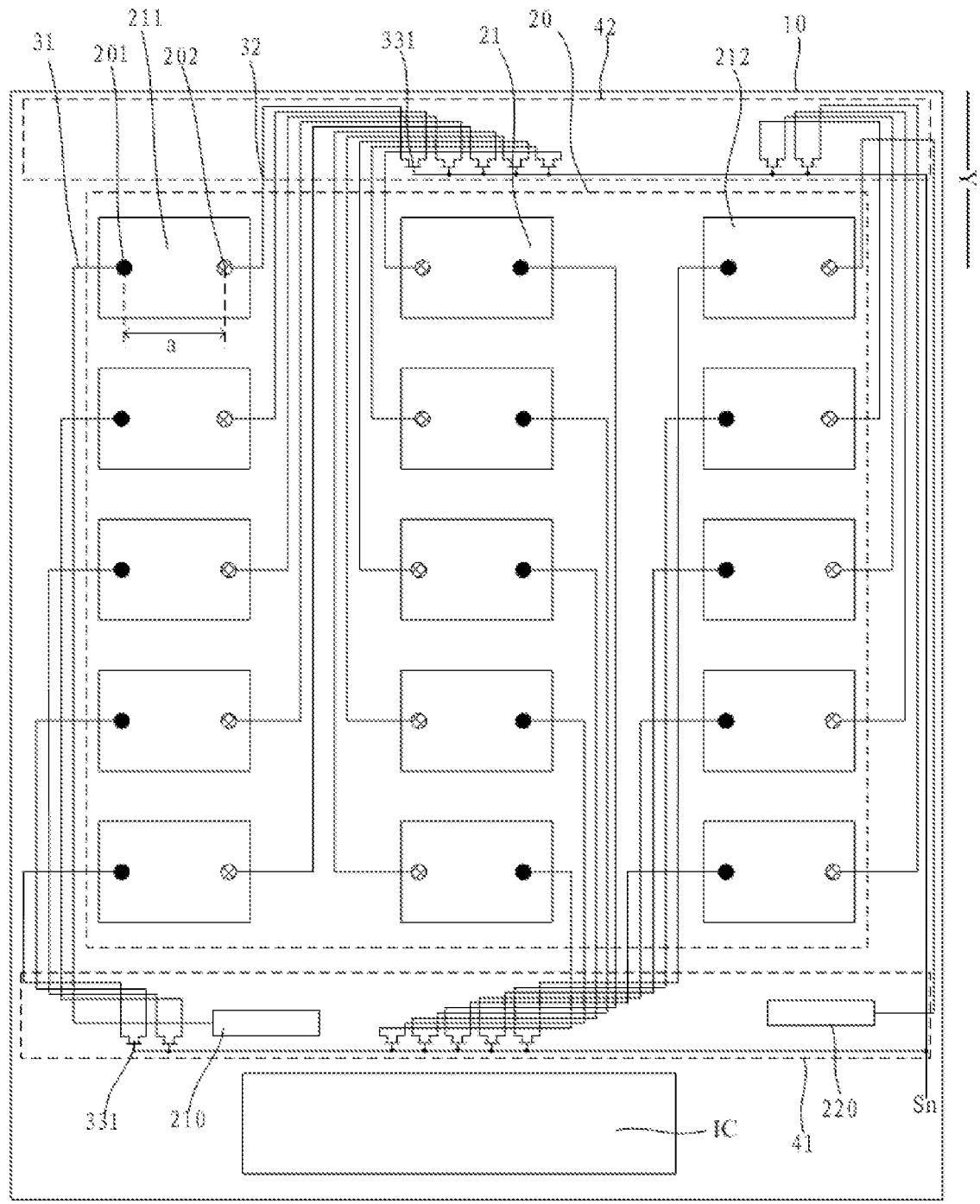
FIG. 7 is a schematic structural diagram showing a touch panel according to another embodiment of the present disclosure.

The connection transistor according to an embodiment of the present disclosure is an N-type transistor or a P-type transistor. In one embodiment of the present disclosure, all the transistors according to the embodiments of the present disclosure have the same type, and all the connection transistors are controlled through one signal terminal. As shown in FIG. 7, all the connection transistors 331 according to an embodiment of the present disclosure have the same type. That is, all the connection transistors 331 are each the N-type transistor or P-type transistor. Further, all the connection transistors 331 receive a connection control signal outputted from the same signal terminal Sn. With all the connection transistors having the same type, the number of the signal terminal is reduced, to simplify the layout of wires.

Figure 8:
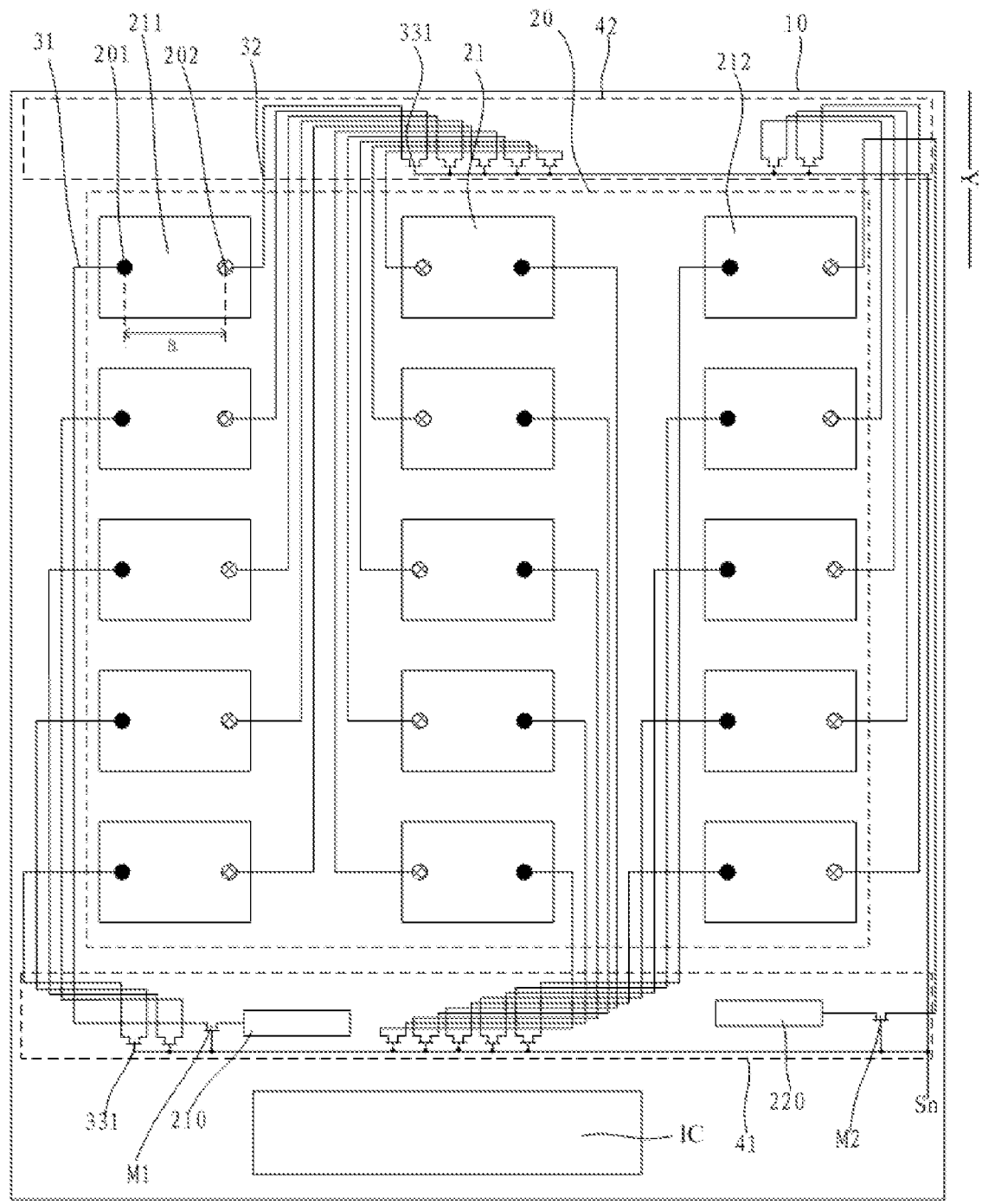
FIG. 8 is a schematic structural diagram showing a touch panel according to another embodiment of the present disclosure.

Reference is made to FIG. 8, which is a schematic structural diagram showing a touch panel according to another embodiment of the present disclosure. The touch electrodes 21 according to the embodiment of the present disclosure include an input touch electrode 211 and an output touch electrode 212. A connection terminal of the input touch electrode 211 is electrically connected to a first test terminal 210. The first test terminal 210 is configured to receive a test signal. A connection terminal of the output touch electrode 212 is electrically connected to a second test terminal 220. The second test terminal 220 is configured to output a feedback signal. The first test terminal 210 and the second test terminal 220 are arranged in the first area 41. The input touch electrode 211 and the output touch electrode 212 according to the embodiment of the present embodiment are two touch electrodes 21, among all the touch electrodes 21, of which one connection terminal is not connected to a connection device 33, that is, the first touch electrode and the last touch electrode after all the touch electrodes 21 are connected in series.

Two of all the touch electrodes according to the embodiments of the present disclosure are the input touch electrode and the output touch electrode. The input touch electrode is configured to receive the test signal. When all the touch electrodes are connected in series, the test signal is inputted from the input touch electrode and flows through all the touch electrodes. The output touch electrode is configured to output a feedback signal. After the test signal flows through all the touch electrodes, the feedback signal is generated at the output touch electrode and is outputted from the output touch electrode, to determine whether a touch electrode among all the touch electrodes connected in series is abnormal based on the feedback signal.

Reference is made to FIG. 8, which is a schematic structural diagram showing a touch panel according to another embodiment of the present disclosure. The touch panel according to the embodiment of the present disclosure further includes a test input transistor M1 and a test output transistor M2. A first terminal of the test input transistor M1 is configured to receive the test signal. A second terminal of the test input transistor M1 is electrically connected to the first connection terminal of the input touch electrode 211. A gate of the test input transistor M1 is configured to receive a test input control signal. A first terminal of the test output transistor M2 is electrically connected to the first connection terminal of the output touch electrode 212. A second terminal of the test output transistor M2 is configured to output the feedback signal. A gate of the test output transistor M2 is configured to receive a test output control signal.

According to the embodiment of the present disclosure, the input and the output of the signal are controlled by the test input transistor and the test output transistor, respectively. Further, the signal is isolated from a touch electrode to prevent an abnormal signal at a test terminal from causing interference to the touch electrode connected to the test terminal in a phase rather than the testing phase.

In an embodiment of the present disclosure, the test input transistor and the test output transistor each are an N-type transistor or a P-type transistor. In one embodiment of the present disclosure, the test input transistor and the test output transistor according to the embodiment of the present disclosure have the same type, and thus are in response to a control signal outputted by the same signal terminal, to reduce the number of the signal terminal. As shown in FIG. 8, the test input transistor M1 and the test output transistor M2 according to the embodiment of the present disclosure are of the same type. Further, the test input transistor M1 and the test output transistor M2 are of the same type as the connection transistor 331. The test input transistor M1, the test output transistor M2, and the connection transistor 331 are all switched on or off simultaneously in response to the control signal outputted by the signal terminal Sn. In the testing phase, the signal terminal Sn outputs a control signal to control the test input transistor M1, the test output transistor M2 and the connection transistor 331 are all on. All the touch electrodes 21 are connected in series via the connection transistor 331, to form a branch. The test input transistor M1 inputs the test signal into the branch, and the test output transistor M2 outputs the feedback signal. In the phase rather than the testing phase, the signal terminal Sn outputs a control signal to control the test input transistor M1, the test output transistor M2, and the connection transistor 331 are all off. All the touch electrodes 21 are isolated from each other. No test signal is inputted and no feedback signal is outputted.

Figure 9:
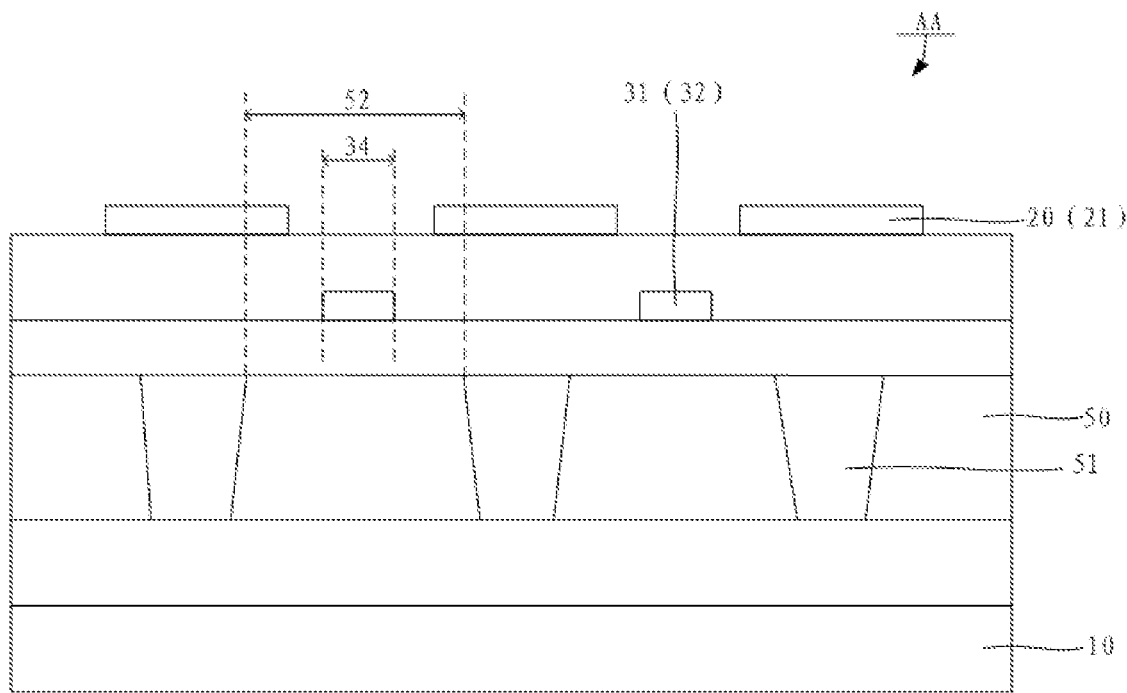
FIG. 9 is a schematic structural diagram showing a touch panel according to another embodiment of the present disclosure.

In an embodiment of the present disclosure, a part of the test lead wire arranged in a display area corresponds to a light-shielding area of the touch panel, to prevent the test lead wire from affecting an aperture ratio of the touch panel. Reference is made to FIG. 9, which is a schematic structural diagram showing a touch panel according to another embodiment of the present disclosure. The touch panel includes a display area AA. The touch electrode array 20 (including the touch electrodes 21) is arranged in the display area AA. The display area AA includes a pixel definition layer 50 arranged between the substrate 10 and the touch electrode array 20. The pixel definition layer 50 includes multiple pixel apertures, and light-emitting elements 51 arranged in the pixel apertures. The test lead wire (including the first test lead wire 31 and/or the second test lead wire 32) is arranged on one side of the pixel definition layer 50 away from the substrate 10. Orthographic projection 34 of the test lead wire on the substrate 10 at least partially overlaps an area between orthographic projection 52 of two adjacent pixel apertures on the substrate 10.

It should be noted that in the touch electrode array 20 according to the embodiment of the present disclosure, the touch electrodes 21 each may be a block electrode, a metal grid electrode or the like, which is not limited in the present disclosure. In a case that the touch electrodes according to the embodiment of the present disclosure each are a metal grid electrode, orthographic projection of a grid line of the metal grid electrode on the substrate 10 is located between the orthographic projection of adjacent pixel apertures on the substrate 10. That is, the grid line is arranged in the light-shielding area of the touch panel, to prevent the grid line from affecting light transmission of the touch panel.

Figure 10:
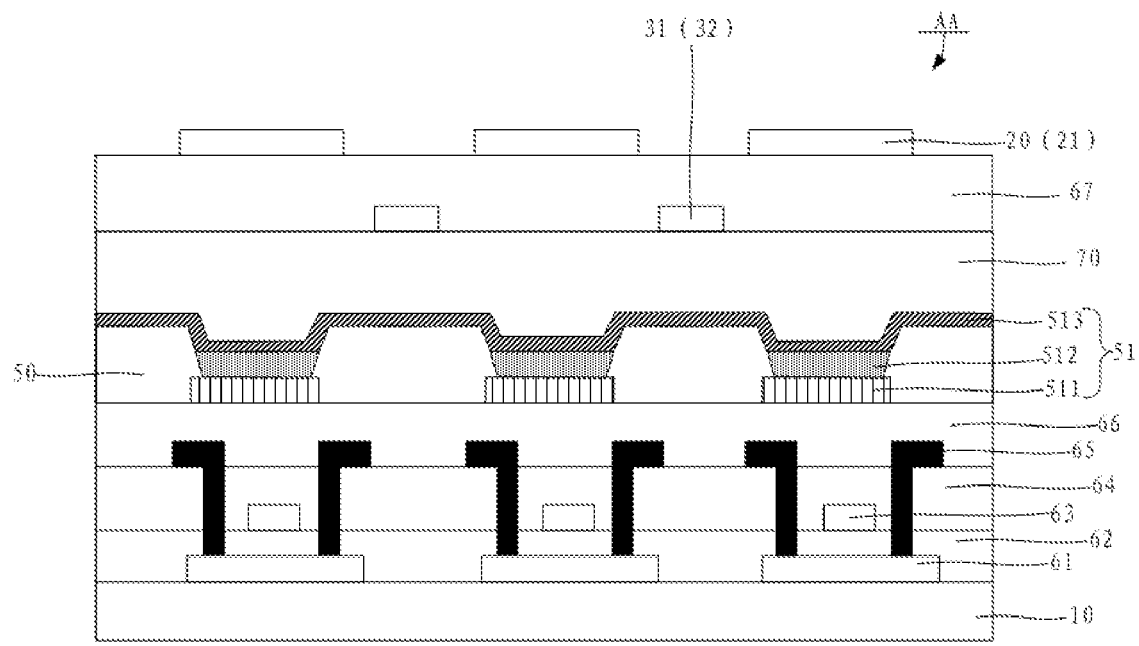
FIG. 10 is a schematic structural diagram showing a touch panel according to another embodiment of the present disclosure.

Reference is made to FIG. 10, which is a schematic structural diagram showing a touch panel according to another embodiment of the present disclosure. The touch panel according to the embodiment of the present disclosure includes a transistor array layer arranged between the pixel definition layer 50 and the substrate 10. The transistor array layer includes a semiconductor layer 61 arranged on the substrate 10, a gate insulating layer 62 arranged on one side of the semiconductor layer 61 away from the substrate 10, a gate metal layer 63 arranged on one side of the gate insulating layer 62 away from the substrate 10, an interlayer insulating layer 64 arranged on one side of the gate metal layer 63 away from the substrate 10, a source-drain metal layer 65 arranged on one side of the interlayer insulating layer 64 away from the substrate 10 and a planarization layer 66 arranged on one side of the source-drain metal layer 65 away from the substrate 10. The semiconductor layer 61 includes an active area of a transistor. The gate metal layer 63 includes a gate of the transistor. The source-drain metal layer 65 includes a source and a drain of the transistor. The source and the drain are in communication with the active area through their respective through holes.

As shown in FIG. 10, the light-emitting element 51 according to the embodiment of the present disclosure includes an anode 511 arranged on one side of the planarization layer 66 away from the substrate 10, a light-emitting layer 512 arranged on one side of the anode 511 away from the substrate 10 and in the pixel aperture, and a cathode 513 arranged on one side of the light-emitting layer 512 away from the substrate 10. Multiple cathodes 513 are electrically connected to each other.

As shown in FIG. 10, an encapsulation layer 70 is arranged on one side of the cathode 513 away from the substrate 10 according to the embodiment of the present disclosure. The touch electrode array 20 (including the touch electrodes 21) and the test lead wire are both arranged on one side of the packaging layer 70 away from the substrate 10.

Figure 11:
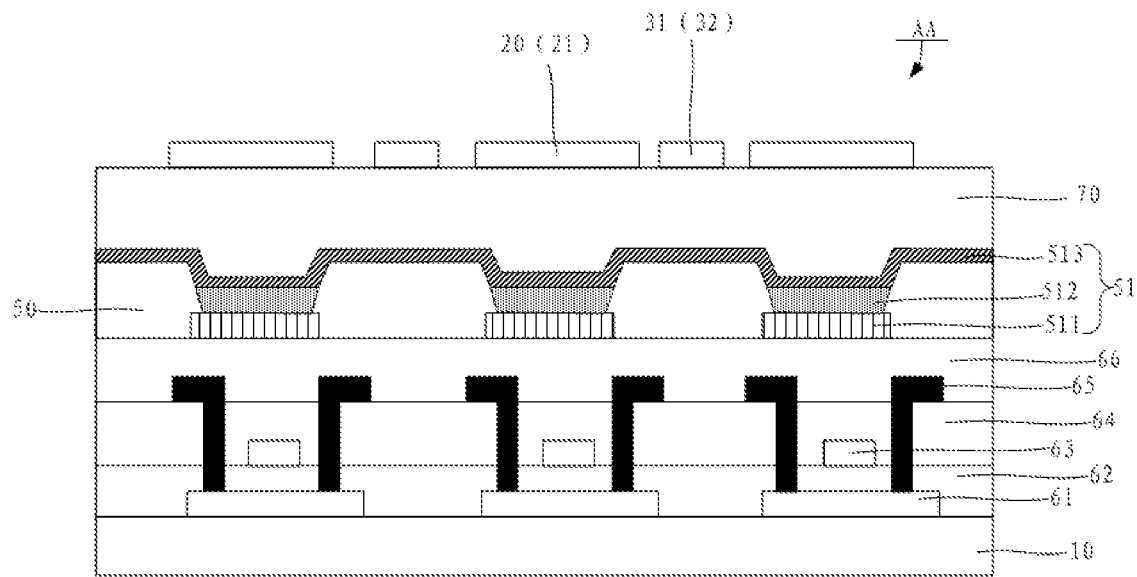
FIG. 11 is a schematic structural diagram showing a touch panel according to another embodiment of the present disclosure.

In an embodiment of the present disclosure, the touch electrode and the test lead wire are in the same layer, that is, the touch electrode and the test lead wire are made of the same conductive film. Reference is made to FIG. 11, which is a schematic structural diagram showing a touch panel according to another embodiment of the present disclosure. In FIG. 11, the touch electrode 21 and the test lead wire 31 (32) are arranged in the same layer.

In one embodiment, the touch electrode is arranged in a layer different from a layer in which the test lead wire is arranged. In this case, the test lead wire is connected to the touch electrode through a through hole. As shown in FIG. 10, the touch electrode 21 according to the embodiment of the present disclosure is arranged on one side of the test lead wire 31 (32) away from the substrate 10, and an insulating layer 67 is arranged between the touch electrode 21 and the test lead wire 31 (32). The touch electrode 21 is arranged on the side of the test lead line 31 (32) away from the substrate 10, to reduce a distance between the touch electrode 21 and a touch object, to improve touch effect.

Figure 12:
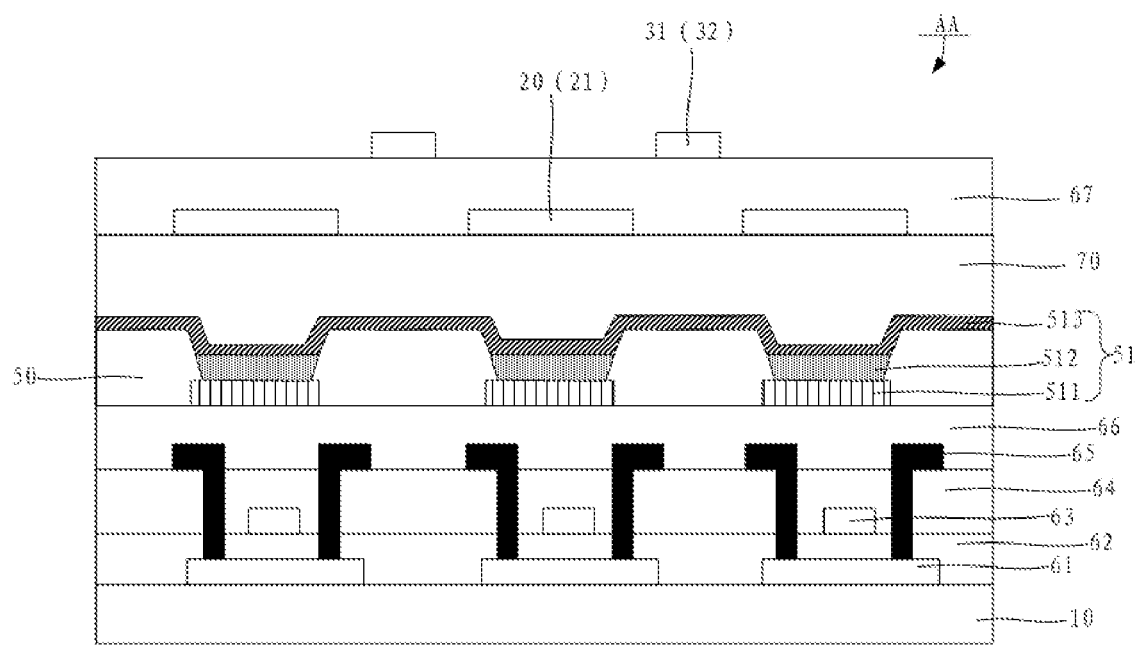
FIG. 12 is a schematic structural diagram showing a touch panel according to another embodiment of the present disclosure.

In one embodiment, reference is made to FIG. 12, which is a schematic structural diagram showing a touch panel according to another embodiment of the present disclosure. In this embodiment, the touch electrode 21 is arranged in a layer different from a layer in which the test lead wire 31 (21) is arranged. The test lead wire 31 (32) is arranged on one side of the touch electrode 21 away from the substrate 10, and an insulating layer 67 is arranged between the touch electrode 21 and the test lead wire 31 (32), which is not limited in the present disclosure.

Figure 13:
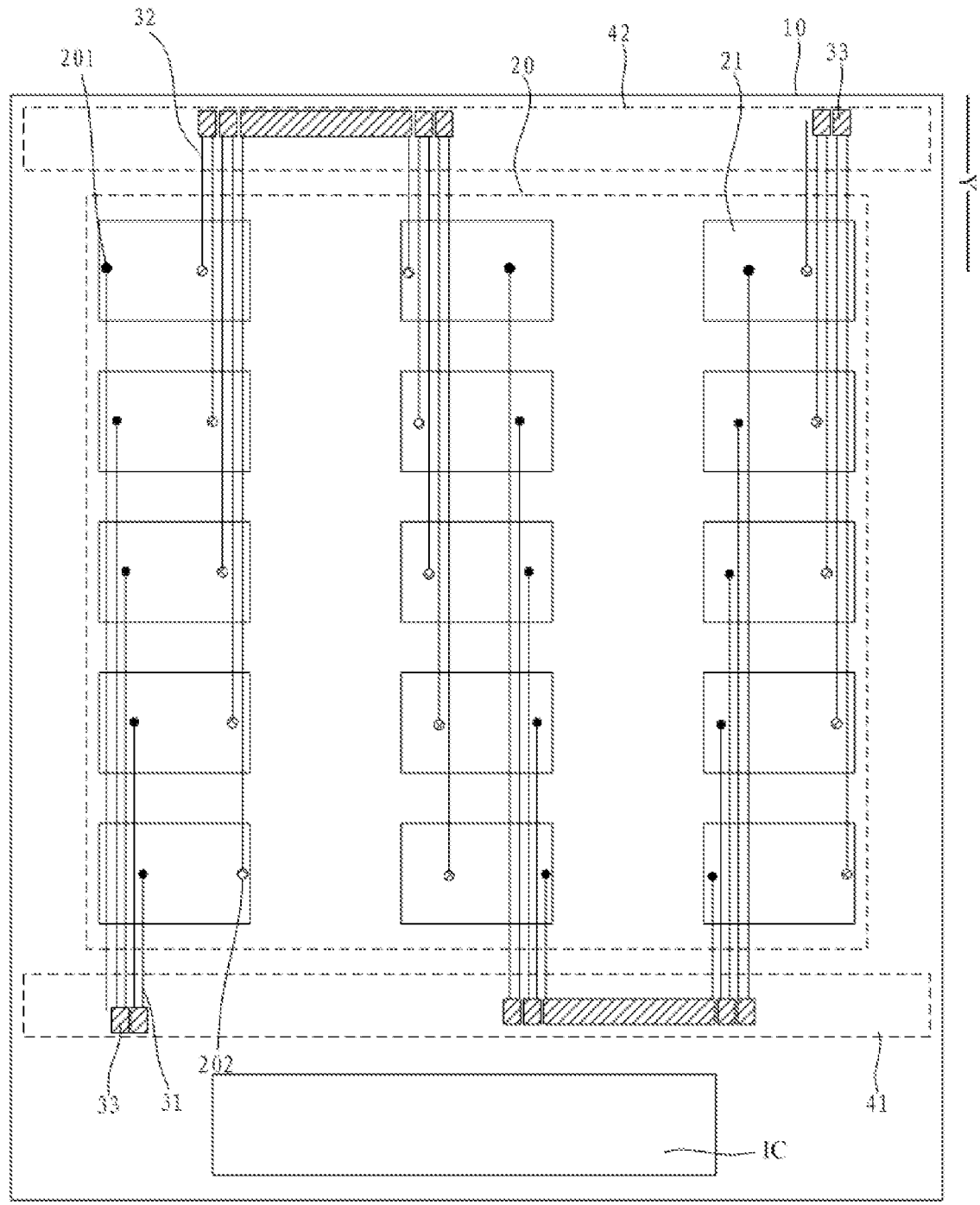
FIG. 13 is a schematic structural diagram showing a touch panel according to another embodiment of the present disclosure.

Reference is made to FIG. 13, which is a schematic structural diagram showing a touch panel according to another embodiment of the present disclosure. All the touch electrodes 21 according to the embodiment of the present disclosure are arranged in an array of multi-row×multi-column. The touch electrode 21 and the test lead wire 31 (32) are arranged in different layers. Orthographic projection of the test lead wire 31 (32) connected to a touch electrode 21 in a row on the substrate 10 at least partially overlaps orthographic projection of the touch electrodes 21 in the row on the substrate 10. The touch electrode 21 overlaps the test lead line 31 (32), and the touch electrode 21 is large in area, to optimize the touch effect of the touch panel.

Figure 14:
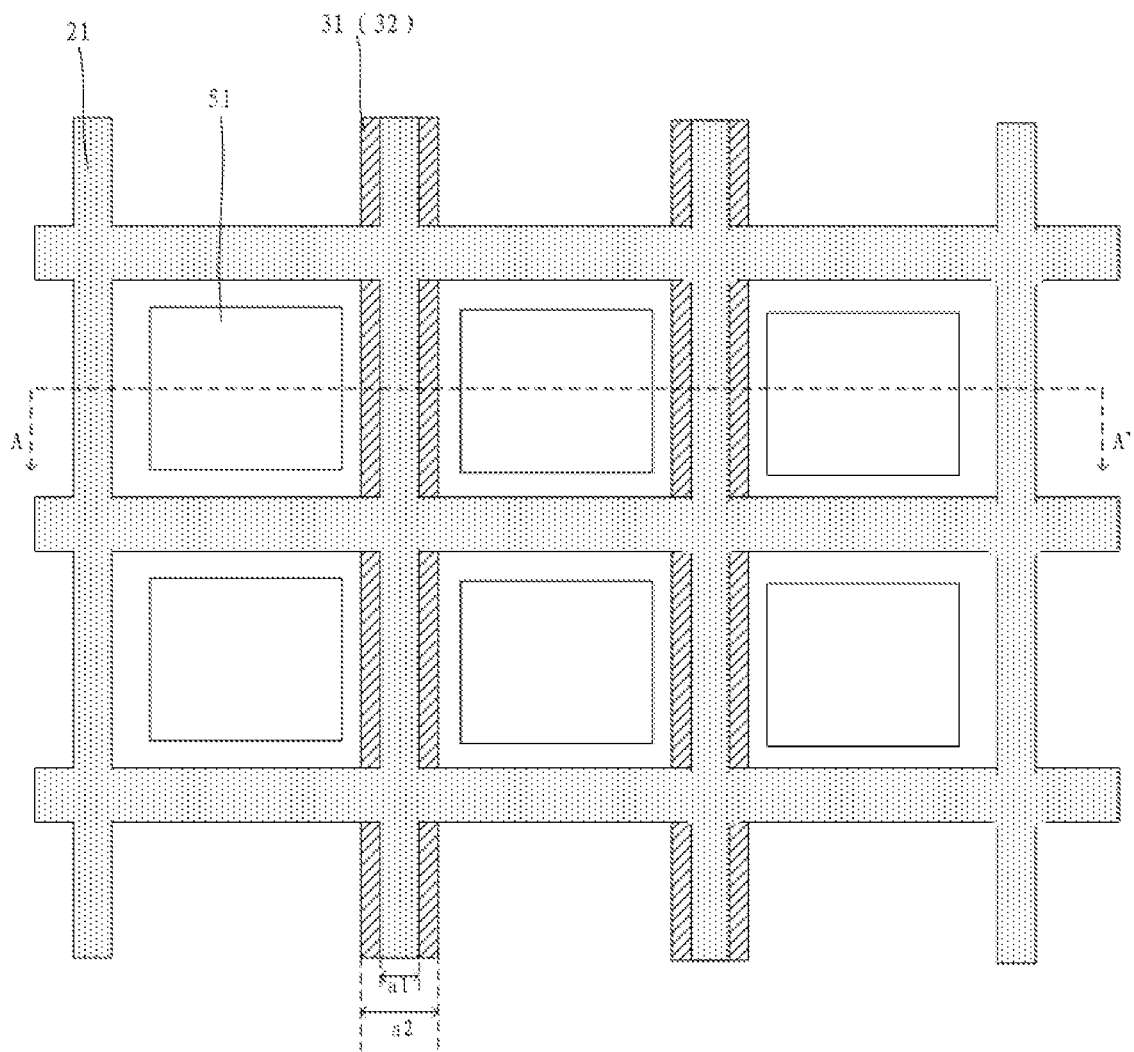
FIG. 14 is a schematic structural diagram showing a touch panel according to another embodiment of the present disclosure.
Figure 15:
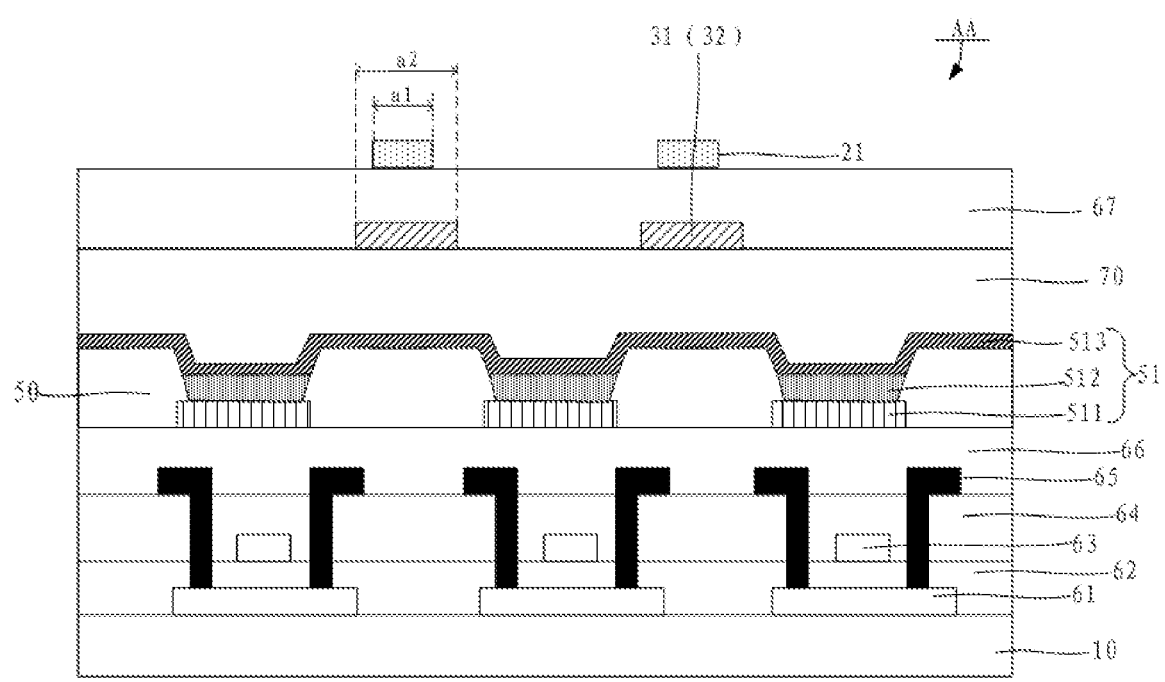
FIG. 15 is a cross-sectional view of the touch panel in a direction of AA' in FIG. 14.

Reference is made to FIG. 14 and FIG. 15. FIG. 14 is a schematic structural diagram showing a touch panel according to another embodiment of the present disclosure. FIG. 15 is a cross-sectional view of the touch panel in a direction of AA' in FIG. 14. The touch electrode 21 according to the embodiment of the present disclosure is arranged on the side of the test lead line 31 (32) away from the substrate 10. The multiple touch electrodes 21 include a grid touch electrode. A hollow of the grid touch electrode exposes the light-emitting element 51. The orthographic projection of the test lead wire 31 (32) on the substrate 10 covers the orthographic projection of a grid line of the grid touch electrode 21 on the substrate 10. A width a1 of the grid line of the grid touch electrode 21 is smaller than a width a2 of the test lead line 31 (32), further, $0.2\ \mu m \leq a2-a1 \leq 1\ \mu m$.

In the touch panel according to the embodiment of the present disclosure, the test lead wire is prepared before the grid touch electrode. After the test lead wire is prepared, an insulating film layer is formed on one side of the test lead wire away from the substrate. Due to the test lead wire, the insulating film layer has a slope at both sides of the test lead wire. Therefore, the grid line is smaller than the test lead line in width at least at an overlap between the test lead line and the grid line, and the orthographic projection of the test lead wire on the substrate completely covers the orthographic projection of the grid line of the grid touch electrode on the substrate, preventing the material from flowing out at the slope of the insulating film layer during the preparation of the grid line, to avoid abnormal conditions such as line short circuit and open circuit.

Figure 16:
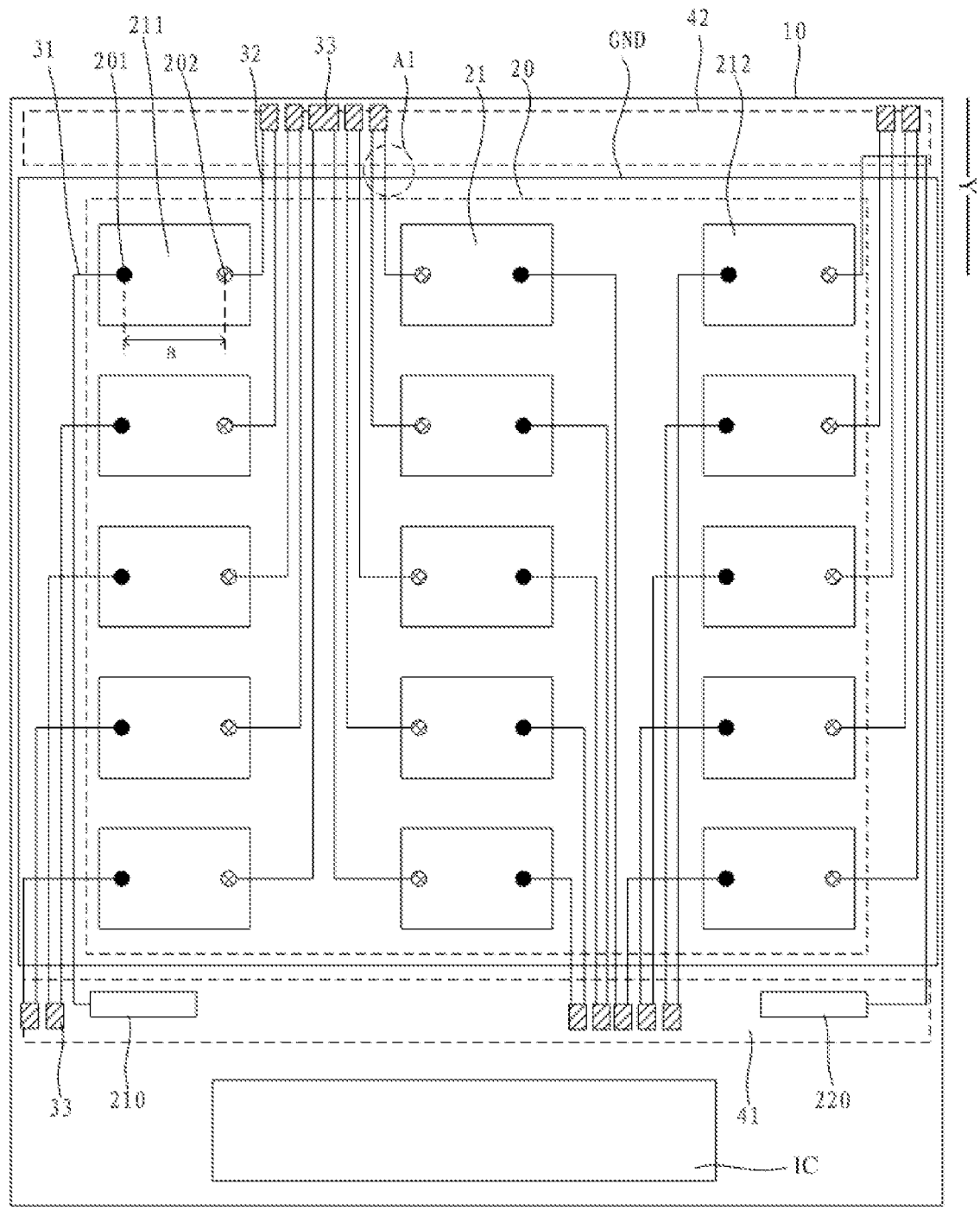
FIG. 16 is a schematic structural diagram showing a touch panel according to another embodiment of the present disclosure.
Figure 17:
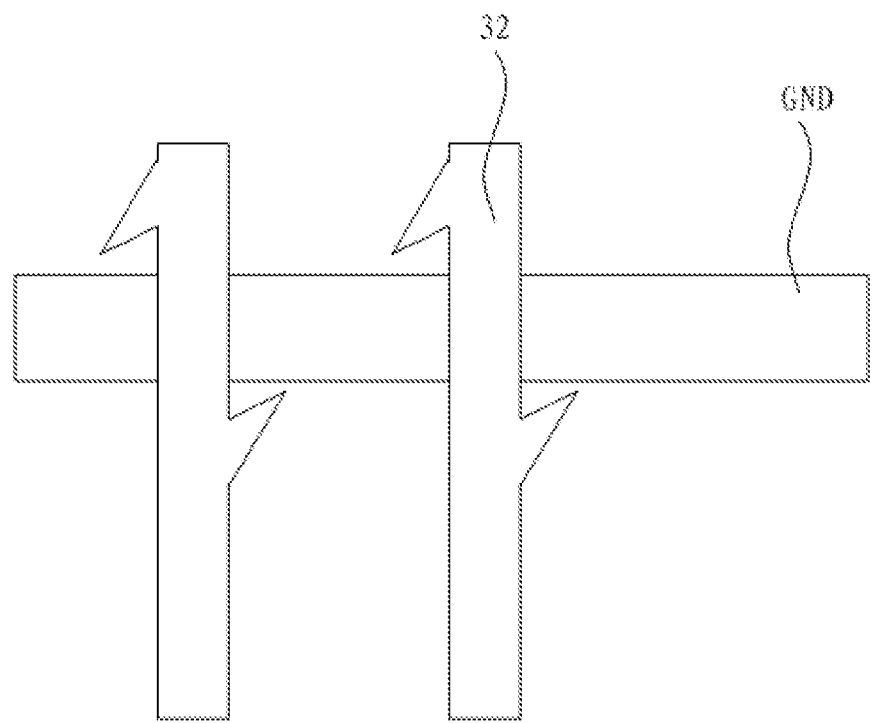
FIG. 17 is a diagram showing that an area A1 in FIG. 16 is enlarged.

Reference is made to FIG. 16 and FIG. 17. FIG. 16 is a schematic structural diagram showing a touch panel according to another embodiment of the present disclosure. FIG. 17 is a diagram showing that an area A1 in FIG. 16 is enlarged. The touch panel according to the embodiment of the present disclosure includes a ground wire GND arranged on a different layer from the test lead wire 31 (32). The test lead wire 31 (32) includes a tip portion 301. A tip of the tip portion 301 faces the ground wire GND, and static electricity flowing through the test lead wire 31 (32) is discharged to the ground wire GND based on the principle of point discharge, to improve antistatic ability of the touch panel.

As further shown in FIG. 17, at least the tip of the tip portion 301 according to an embodiment of the present disclosure overlaps the ground line GND in a direction perpendicular to a plane in which the touch panel is arranged, to further improving the antistatic ability of the touch panel.

In an embodiment of the present disclosure, the connection device is arranged outside the area where the touch electrode array is arranged, to prevent the connection device from affecting a circuit structure in the area where the touch electrode array is arranged. As shown in FIG. 16, the connection device 33 does not overlap the touch electrode array 20 in a thickness direction of the touch panel (that is, in the direction perpendicular to the plane where the touch panel is arranged).

Figure 18:
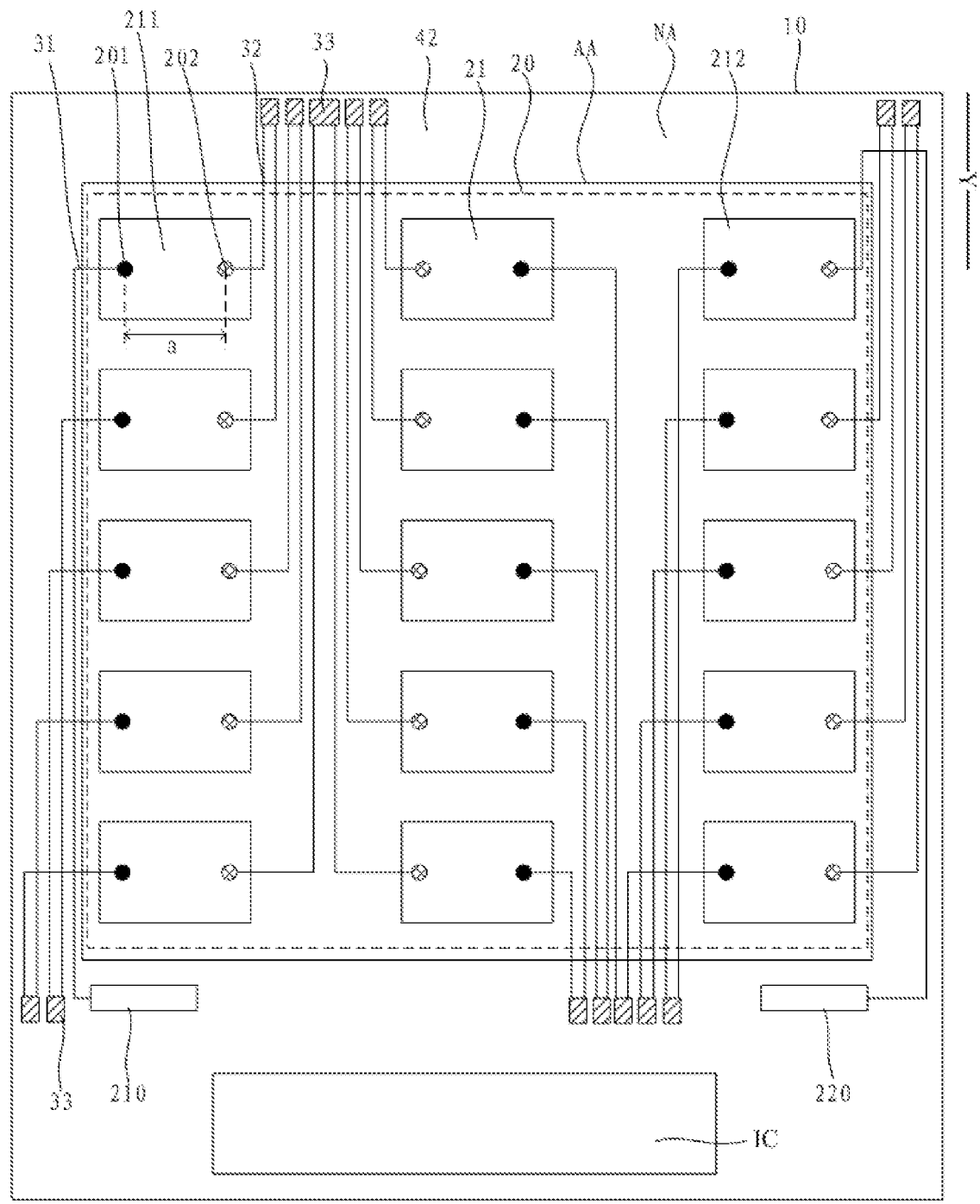
FIG. 18 is a schematic structural diagram showing a touch panel according to another embodiment of the present disclosure.

In one embodiment of the present disclosure, the connection device according to an embodiment of the present disclosure is arranged in a frame area of the touch panel. Reference is made to FIG. 18, which is a schematic structural diagram showing a touch panel according to another embodiment of the present disclosure. The touch panel according to the embodiment of the present disclosure includes a display area AA, and a frame area NA at least partially surrounding the display area AA. The touch electrode array 20 is arranged in the display area AA. The connection device 33 is arranged in the frame area NA. In a case that connection device 33 according to an embodiment of the present disclosure is located in the frame area NA, the connection device 33 includes a connection transistor. Controllable connection between touch electrodes 21 is achieved by the connection transistor. Therefore, all the touch electrodes 21 are connected in series during the testing phase and are isolated from each other during the phase rather than the testing phase.

Figure 19:
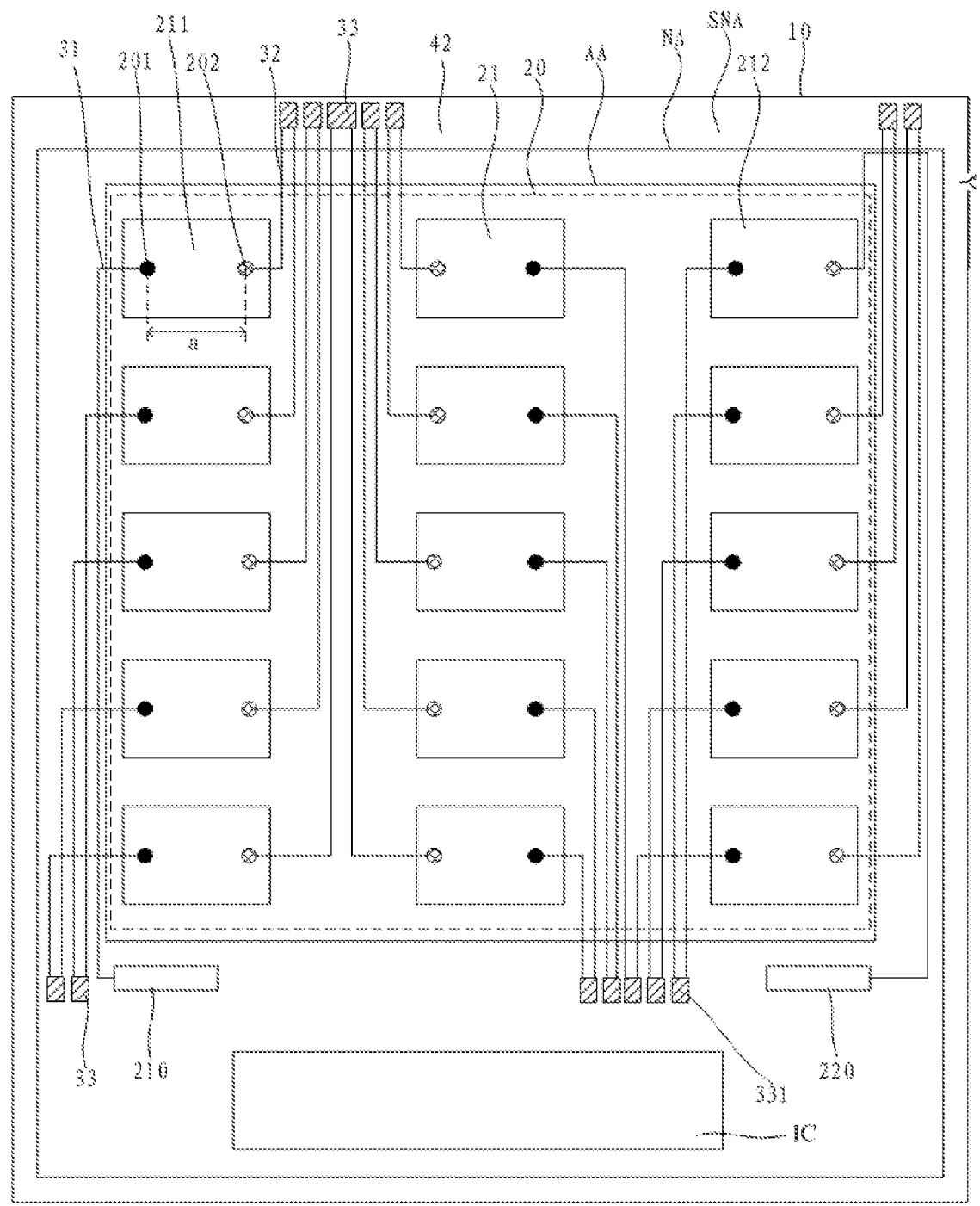
FIG. 19 is a schematic structural diagram showing a touch panel according to another embodiment of the present disclosure.

In one embodiment of the present disclosure, the touch panel according to the embodiment of the present disclosure is an unfinished panel before being cut. Some of connection devices are arranged in a to-be-cut area of the touch panel and other connection devices are arranged in the frame area. In one embodiment, all the connection devices are arranged in the to-be-cut area. Reference is made to FIG. 19, which is a schematic structural diagram showing a touch panel according to another embodiment of the present disclosure. The touch panel according to the embodiment of the present disclosure includes a display area AA, a frame area NA at least partially surrounding the display area, and a to-be-cut area SNA at one side of the frame area NA away from the display area AA. The touch electrode array 20 is arranged in the display area AA. The connection devices 33 include a first connection device 331 and a second connection device 332. The first connection device 331 is arranged in the frame area NA. The second connection device 332 is arranged in the to-be-cut area SNA. The touch panel according to the embodiment of the present disclosure is tested before cutting. During the testing phase, the connection device 33 connects all the touch electrodes 21 in series for testing. Before the phase rather than the testing phase, the to-be-cut area SNA is removed and thus the second connection device 332 is removed, and the first connection device 331 is off during the phase rather than the testing phase, to isolate all the touch electrodes 21 from each other.

In an embodiment of the present disclosure, the test lead wire spans the frame area NA to the to-be-cut area SNA. The entire test lead wire according to the present disclosure is of the same material. In one embodiment, the touch electrode is a metal grid electrode and is in the same layer as the test lead wire, and the test lead wire is made of a laminated composite material of Ti—Al—Ti. Further, the test lead wire according to the embodiment of the present disclosure may be divided into segments made of different materials. In one embodiment, the touch panel is divided into two areas, where a first divided area is a cross-border area of the frame area NA and the to-be-cut area SNA, and a second divided area is the remaining area. The test lead wire in the second divided area is made of a laminated composite material of Ti—Al—Ti. Since the segment of the test lead line in the to-be-cut area SNA is to be cut, in order to avoid corrosion of an exposed Al layer of the test lead line at an edge of the frame area NA after cutting, the segment of the test lead line in the first divided area is in the same layer as the gate metal layer or the source-drain metal layer. The test lead wire in the first divided area is made of Mo.

Figure 20:
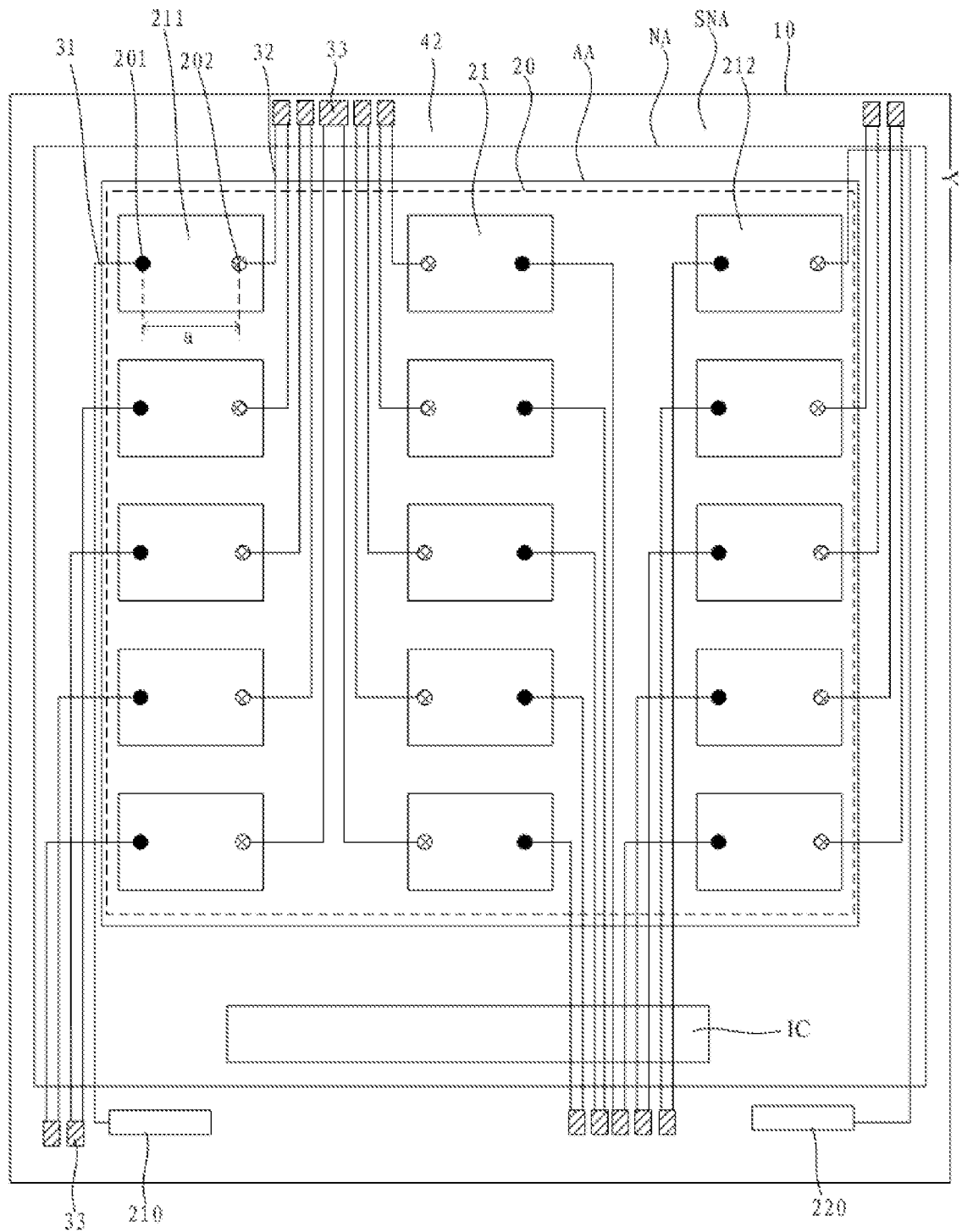
FIG. 20 is a schematic structural diagram showing a touch panel according to another embodiment of the present disclosure.

In one embodiment, reference is made to FIG. 20, which is a schematic structural diagram showing a touch panel according to another embodiment of the present disclosure. The touch panel according to the embodiment of the present disclosure includes a display area AA, a frame area NA at least partially surrounding the display area, and a to-be-cut area SNA arranged at one side of the frame area NA away from the display area AA. The touch electrode array 20 is arranged in the display area AA. All the connection devices 33 are arranged in the to-be-cut area SNA. The touch panel according to the embodiment of the present disclosure is tested before cutting. During the testing phase, the connection device 33 connects all the touch electrodes 21 in series for testing. Before the phase rather than the testing phase, the to-be-cut area SNA is removed and thus all the connection devices are removed, to isolate all the touch electrodes 21 from each other.

In an embodiment of the present disclosure, the first test terminal 210 and the second test terminal 220 are arranged in the frame area NA, or in the to-be-cut area SNA, which is not limited in the present disclosure.

Figure 21:
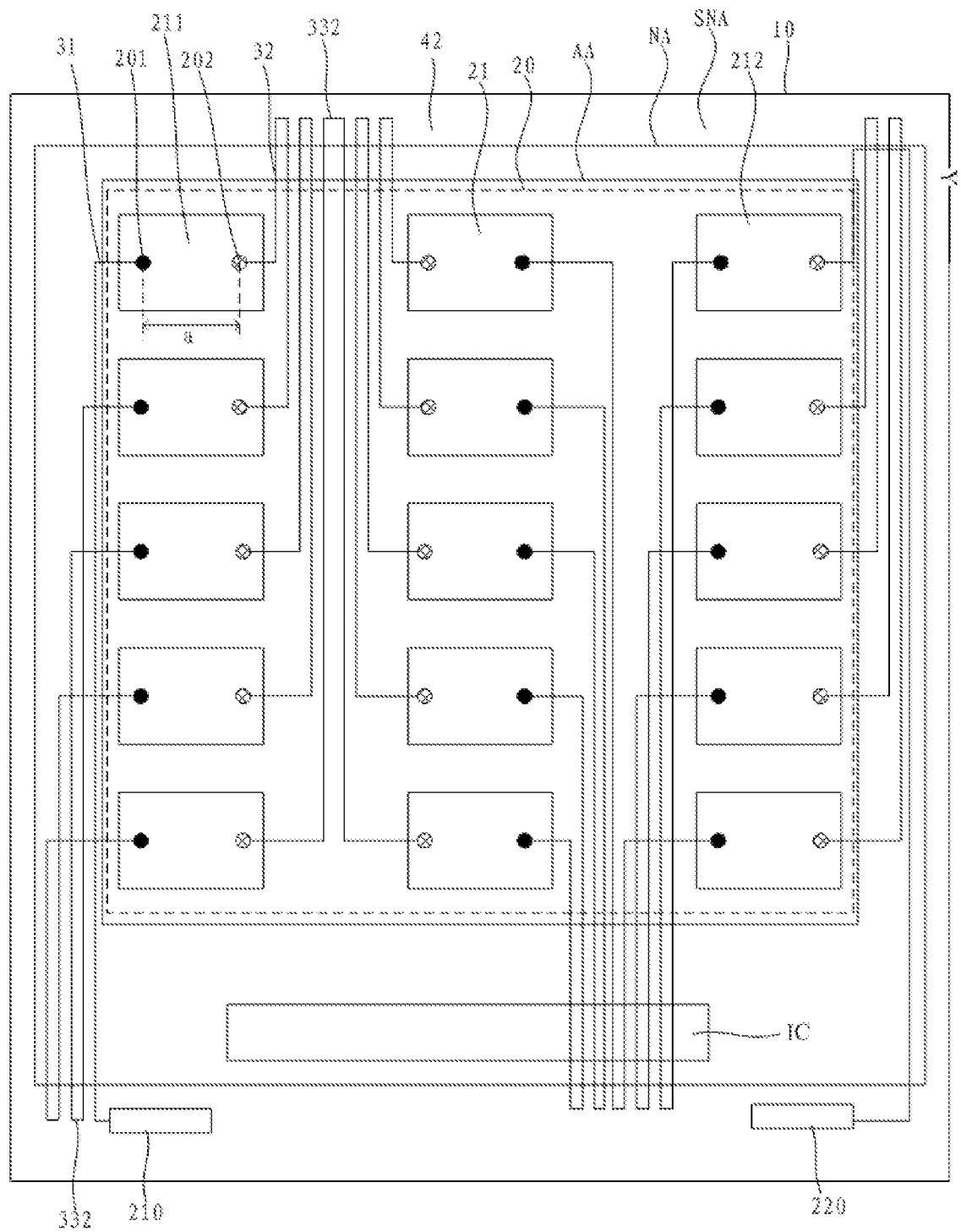
FIG. 21 is a schematic structural diagram showing a touch panel according to another embodiment of the present disclosure.

Reference is made to FIG. 21, which is a schematic structural diagram showing a touch panel according to another embodiment of the present disclosure. The connection device 33 arranged in the to-be-cut area SNA includes a short wire 332. A first end of the short wire 332 is electrically connected to one of the two touch electrodes 21 electrically connected to the connection device 33. A second end of the short wire 332 is electrically connected to the other of the two touch electrodes 21 electrically connected to the connection device 33.

In one embodiment of the present disclosure, the connection device arranged in the to-be-cut area according to the embodiment of the present disclosure is a connection transistor, which is not limited in the present disclosure.

Figure 22:
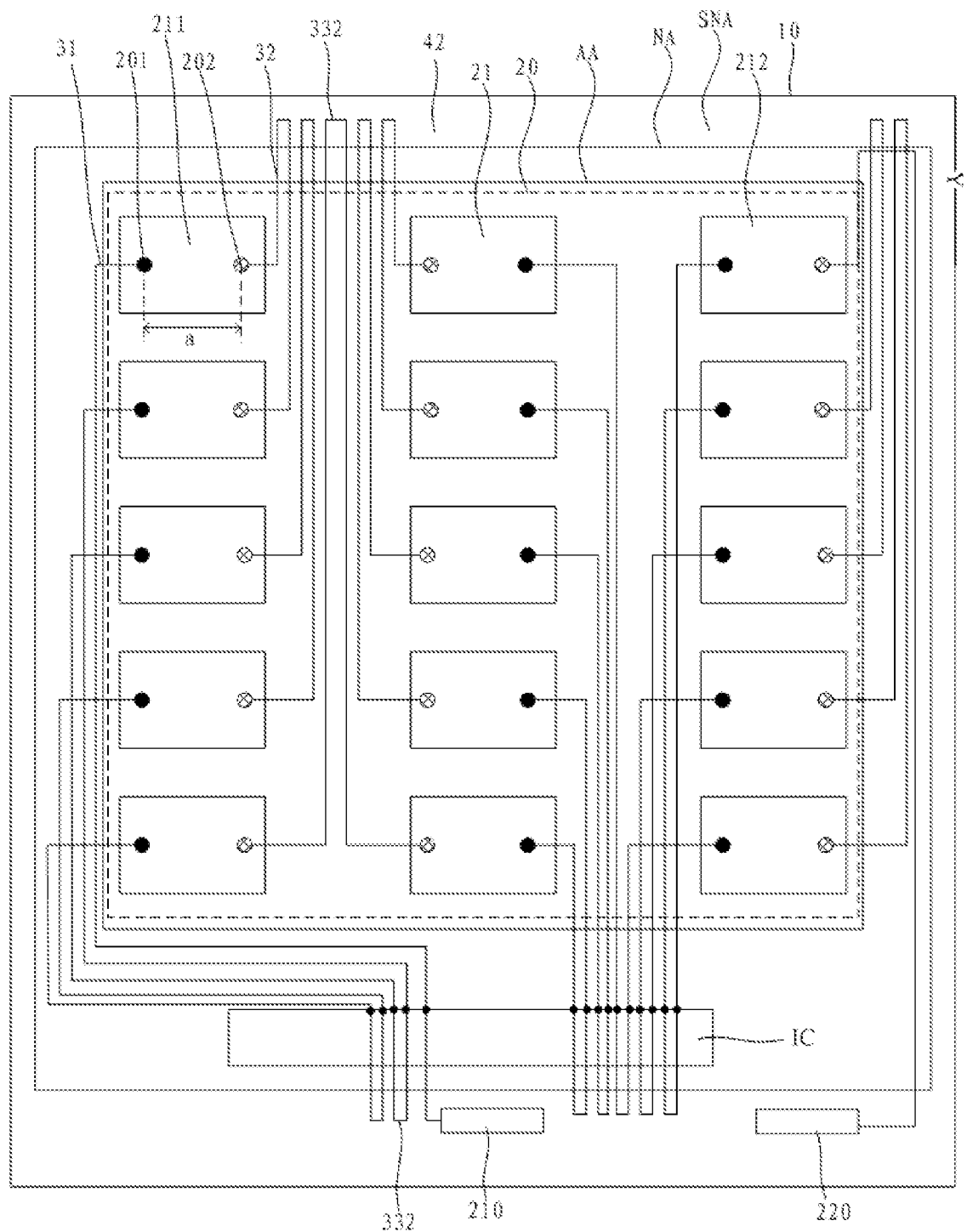
FIG. 22 is a schematic structural diagram showing a touch panel according to another embodiment of the present disclosure.

In an embodiment of the present disclosure, the test lead wire doubles as a touch lead wire and is connected to a control chip, and a touch signal is inputted to the touch electrode through the test lead wire. During the phase rather than the testing phase according to the embodiment of the present disclosure, the touch electrodes are isolated from each other and the test lead wires are isolated from each other. In this case, the test lead wire serves as the touch lead, to reduce the number of wires on the touch panel. Reference is made to FIG. 22, which is a schematic structural diagram showing a touch panel according to another embodiment of the present disclosure. The first test lead wires 31 according to the embodiment of the present disclosure are all connected to the touch chip IC and extend to the to-be-cut area SNA. During the testing phase, the control chip IC transmits no signal to its terminal connected the first test lead wire 31. During the phase rather than the testing phase, the touch electrodes 21 are isolated from each other since the connection device 33 in the to-be-cut area SNA is removed. In this case, the control chip IC transmits a touch signal to the touch electrode 21 through the first test lead 31.

Accordingly, a method for testing a touch panel is further provided according to an embodiment of the present disclosure. The method is applied to the touch panel according to any one of the above embodiments. The method includes: connecting all touch electrodes in series to obtain a branch during a testing phase, inputting a test signal to the branch, and analyzing a feedback signal outputted by the branch for determination; and isolating all the touch electrodes from each other during a phase rather than the testing phase.

Accordingly, a display device is further provided according to an embodiment of the present disclosure. The display device includes the touch panel according to any one of the above embodiments.

Figure 23:
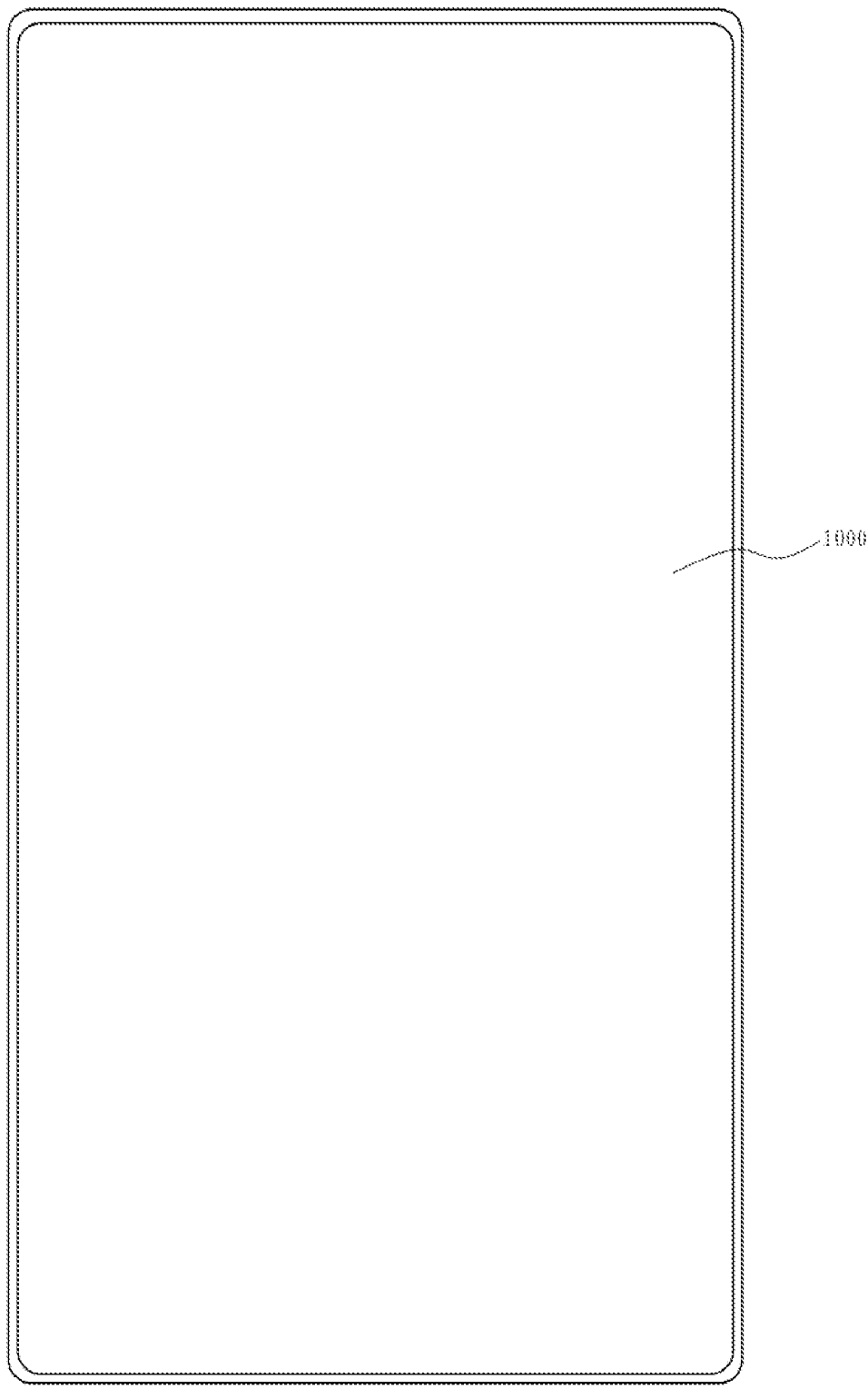
FIG. 23 is a schematic structural diagram showing a display device according to an embodiment of the present disclosure.

Reference is made to FIG. 23, which is a schematic structural diagram showing a display device according to an embodiment of the present disclosure.

A display device 1000 according to an embodiment of the present disclosure is a mobile terminal device.

In other embodiments of the present disclosure, the display device is an electronic display device such as a computer and a vehicle-mounted terminal, which is not limited in the present disclosure.

A touch panel, a method for testing the touch panel and a display device are provided according to embodiments of the present disclosure. The touch panel includes: a substrate; a touch electrode array on a side of the substrate, where the touch electrode array includes multiple touch electrodes arranged in an array; and a test circuit electrically connected to the touch electrode array, where the test circuit is configured to connect all the touch electrodes in series during a testing phase, and electrically isolate all the touch electrodes from each other during a phase rather than the testing phase.

According to the embodiments of the present disclosure, in order to test the touch panel, all the touch electrodes are connected in series to obtain a branch during the testing phase, a test signal is inputted to the branch, and a feedback signal outputted by the branch is analyzed for determination. All the touch electrodes are isolated from each other during a phase rather than the testing phase. Therefore, whether a touch electrode is abnormal is determined by controlling all the touch electrodes to be connected in series during the testing phase and isolated from each other during the phase rather than the testing phase, to improve efficiency for testing a touch electrode and simplifying the process of testing the touch electrode.

What is claimed is:

1. A touch panel, comprising:
a substrate;
a touch electrode array arranged on a side of the substrate, wherein the touch electrode array comprises a plurality of touch electrodes arranged in an array;
a test circuit electrically connected to the touch electrode array, wherein the test circuit is configured to connect all the touch electrodes in series during a testing phase, and electrically isolate all the touch electrodes from each other during a phase rather than the testing phase, and the test circuit comprises a plurality of test lead wires; and
a ground wire arranged in a different layer from the plurality of test lead wires, wherein the plurality of test lead wires comprise a tip portion, and a tip of the tip portion faces the ground wire, wherein at least the tip of the tip portion overlaps the ground wire in a direction perpendicular to a plane in which the touch panel is arranged.

2. The touch panel according to claim 1, wherein each of the plurality of touch electrodes comprises a first connection terminal and a second connection terminal, and a distance between the first connection terminal and the second connection terminal is greater than zero, and wherein
the plurality of test lead wires comprise a first test lead wire and a second test lead wire, the first test lead wire is electrically connected to the first connection terminal of the touch electrode, the second test lead wire is electrically connected to the second connection terminal of the touch electrode, the first test lead wire extends to a first area, the second test lead wire extends to a second area, along a first direction the first area is at one end of the plurality of touch electrodes and the second area is at the other end of the plurality of touch electrodes, and the first direction is parallel to a plane in which the touch panel is arranged.

3. The touch panel according to claim 2, wherein the test circuit comprises a plurality of connection modules, and wherein among the plurality of touch electrodes, a first test lead wire electrically connected to an $n^{th}$ touch electrode is electrically connected to a first test lead wire electrically connected to an $(n-1)^{th}$ touch electrode via a connection module among the plurality of connection modules, and a second test lead wire electrically connected to the $n^{th}$ touch electrode is electrically connected to a second test lead wire electrically connected to an $(n+1)^{th}$ touch electrode via a connection module among the plurality of connection modules, n is a positive integer greater than or equal to 3.

4. The touch panel according to claim 3, wherein each of the plurality of connection modules comprises a connection transistor, a first terminal of the connection transistor is electrically connected to one of two touch electrodes electrically connected to the connection module, a second terminal of the connection transistor is electrically connected to the other of the two touch electrodes electrically connected to the connection module, and a gate of the connection transistor is configured to receive a connection control signal, and wherein in response to the connection control signal, the connection transistor is switched on in the testing phase and is switched off in the phase rather than the testing phase.

5. The touch panel according to claim 4, wherein all the connection transistors are of a same type, and are configured to receive a connection control signal outputted from a same signal terminal.

6. The touch panel according to claim 3, wherein each of the plurality of connection modules do not overlap the touch electrode array in a thickness direction of the touch panel.

7. The touch panel according to claim 6, further comprising:
a display area; and
a frame area at least partially surrounding the display area, wherein the touch electrode array is arranged in the display area, and the plurality of connection modules are arranged in the frame area.

8. The touch panel according to claim 6, further comprising:
a display area;
a frame area at least partially surrounding the display area; and
a to-be-cut area at a side of the frame area away from the display area, wherein
the touch electrode array is arranged in the display area, and the plurality of connection modules comprise a first connection module and a second connection module, the first connection module is arranged in the frame area, and the second connection module is arranged in the to-be-cut area; or
the touch electrode array is arranged in the display area, and all the connection modules are arranged in the to-be-cut area.

9. The touch panel according to claim 8, wherein a connection module among the plurality of connection modules arranged in the to-be-cut area comprises a short wire, a first end of the short wire is electrically connected to one of two touch electrodes electrically connected to the connection module, and a second end of the short wire is electrically connected to the other of the two touch electrodes electrically connected to the connection module.

10. The touch panel according to claim 2, wherein the plurality of touch electrodes comprise an input touch electrode and an output touch electrode, a connection terminal of the input touch electrode is electrically connected to a first test terminal, the first test terminal is configured to receive a test signal, a connection terminal of the output touch electrode is electrically connected to a second test terminal, the second test terminal is configured to output a feedback signal, and the first test terminal and the second test terminal are arranged in the first area.

11. The touch panel according to claim 10, further comprising:
a test input transistor, wherein a first terminal of the test input transistor is configured to receive the test signal, a second terminal of the test input transistor is electrically connected to the first connection terminal of the input touch electrode, and a gate of the test input transistor is configured to receive a test input control signal; and
a test output transistor, wherein a first terminal of the test output transistor is electrically connected to the second connection terminal of the output touch electrode, a second terminal of the test output transistor is configured to output the feedback signal, and a gate of the test output transistor is configured to receive a test output control signal.

12. The touch panel according to claim 2, wherein the first connection terminal and the second connection terminal of the touch electrode are respectively arranged at two ends of the touch electrode along a direction in which a line, between two points having a largest distance on the touch electrode, extends.

13. The touch panel according to claim 2, further comprising:
a display area, wherein
the touch electrode array is arranged in the display area; the display area comprises a pixel definition layer arranged between the substrate and the touch electrode array; and the pixel definition layer comprises a plurality of pixel apertures, and a light-emitting element arranged in each of the plurality of the pixel apertures, and wherein
the plurality of test lead wires are arranged on a side of the pixel definition layer away from the substrate, and orthographic projection of each of the plurality of test lead wires on the substrate at least partially overlaps an area between orthographic projection of two adjacent pixel apertures among the plurality of pixel apertures on the substrate.

14. The touch panel according to claim 2, wherein all the touch electrodes are arranged in an array of multi-row× multi-column, and all the touch electrodes are arranged in a layer and all the test lead wires are arranged in another layer, and wherein
orthographic projection of a test lead wire connected to a touch electrode in a row on the substrate at least partially overlaps orthographic projection of touch electrodes in the row on the substrate.

15. The touch panel according to claim 14, wherein the plurality of touch electrodes comprise a grid touch electrode, and for each of the plurality of test lead wires, orthographic projection the test lead wire on the substrate covers orthographic projection of a grid line of the grid touch electrode on the substrate, and wherein the grid line of the grid touch electrode is narrower than the test lead line.

16. A method for testing a touch panel, wherein the method is applicable to the touch panel according to claim 1; and
the method comprises:
connecting all the touch electrodes in series to obtain a branch during the testing phase, inputting a test signal to the branch, and analyzing a feedback signal outputted by the branch for determination; and
isolating all the touch electrodes from each other during the phase rather than the testing phase.

17. A display device, comprising: a touch panel, wherein the touch panel comprises: a substrate; a touch electrode array arranged on a side of the substrate, wherein the touch electrode array comprises a plurality of touch electrodes arranged in an array; a test circuit electrically connected to the touch electrode array, wherein the test circuit is configured to connect all the touch electrodes in series during a testing phase, and electrically isolate all the touch electrodes from each other during a phase rather than the testing phase, and the test circuit comprises a plurality of test lead wires; and a ground wire arranged in a different layer from the plurality of test lead wires, wherein the plurality of test lead wires comprise a tip portion, and a tip of the tip portion faces the ground wire, wherein at least the tip of the tip portion overlaps the ground wire in a direction perpendicular to a plane in which the touch panel is arranged.

* * * * *